US011436397B2

(12) United States Patent
Mahmoudi et al.

(10) Patent No.: US 11,436,397 B2
(45) Date of Patent: Sep. 6, 2022

(54) COMPUTER-IMPLEMENTED METHOD AND ELECTRONIC DEVICE FOR DETECTING INFLUENTIAL COMPONENTS IN A NETLIST REPRESENTING AN ELECTRICAL CIRCUIT

(71) Applicant: Technische Universität Wien, Vienna (AT)

(72) Inventors: Hiwa Mahmoudi, Vienna (AT); Horst Zimmermann, Eichgraben (AT)

(73) Assignee: TECHNISCHE UNIVERSITÄT WIEN, Vienna (AT)

( * ) Notice: Subject to any disclaimer, the term of this patent is extended or adjusted under 35 U.S.C. 154(b) by 0 days.

(21) Appl. No.: 17/275,385

(22) PCT Filed: Sep. 11, 2019

(86) PCT No.: PCT/EP2019/074226
§ 371 (c)(1),
(2) Date: Mar. 11, 2021

(87) PCT Pub. No.: WO2020/053277
PCT Pub. Date: Mar. 19, 2020

(65) Prior Publication Data
US 2022/0050945 A1    Feb. 17, 2022

(30) Foreign Application Priority Data
Sep. 11, 2018 (EP) .................................... 18193797

(51) Int. Cl.
*G06F 30/327* (2020.01)
*G06F 30/367* (2020.01)
*G06F 30/398* (2020.01)

(52) U.S. Cl.
CPC .......... *G06F 30/327* (2020.01); *G06F 30/367* (2020.01); *G06F 30/398* (2020.01)

(58) Field of Classification Search
USPC ......................................................... 716/103
See application file for complete search history.

(56) References Cited

U.S. PATENT DOCUMENTS

| 8,954,910 | B1* | 2/2015 | Liu ......................... | G06F 30/20 |
| | | | | 716/51 |
| 2005/0177356 | A1* | 8/2005 | Yonezawa ............. | G06F 30/367 |
| | | | | 703/14 |

(Continued)

OTHER PUBLICATIONS

International Search Report (Form PCT/ISA/210) for International Application No. PCT/EP2019/074226 dated Dec. 10, 2019, 3 pages.

(Continued)

*Primary Examiner* — Mohammed Alam
(74) *Attorney, Agent, or Firm* — Withrow & Terranova, P.L.L.C.; Vincent K. Gustafson

(57) ABSTRACT

A computer-implemented method and an electronic device for detecting, in an electrical circuit with electrical components ($M_g$) subject to variations (δ) of their model parameters ($x_j$), those components ($M_g^*$) the model parameter variations (δ) of which have the strongest influence on a performance ($y_n$) of the circuit, comprising: providing a topology (Q) of the circuit and the model parameters ($x_j$) of all components ($M_g$) therein; determining, therefrom, topological patterns ($P_k$) of interconnected components ($M_g$); generating variation samples ($v_n$), each comprising a different set of candidate variations ($x'_j$) of the model parameters ($x_j$); calculating, for each variation sample ($v_n$), the circuit's performance ($y_n$) and a deviation from a standard performance and forming a deviation vector ($y_D$) therefrom; and using the variation samples ($v_n$), the deviation vector ($y_D$) and the topological patterns ($P_k$) in a regression model for detecting the most influential components ($M_g^*$).

18 Claims, 8 Drawing Sheets

(56) References Cited

U.S. PATENT DOCUMENTS

2013/0226544 A1* 8/2013 Mcconaghy .......... G06F 30/398
                                                      703/2
2014/0232432 A1* 8/2014 Fish ..................... G06F 9/3869
                                                      326/104
2022/0050945 A1* 2/2022 Mahmoudi ........... G06F 30/327

OTHER PUBLICATIONS

International Preliminary Report on Patentability (Form PCT/IB/373) and Written Opinion (Form PCT/ISA/237) for International Application No. PCT/EP2019/074226 dated Mar. 9, 2021, 10 pages.
Examination Report for European Patent Application No. 19768785.8, dated Mar. 24, 2022, 5 pages.

* cited by examiner

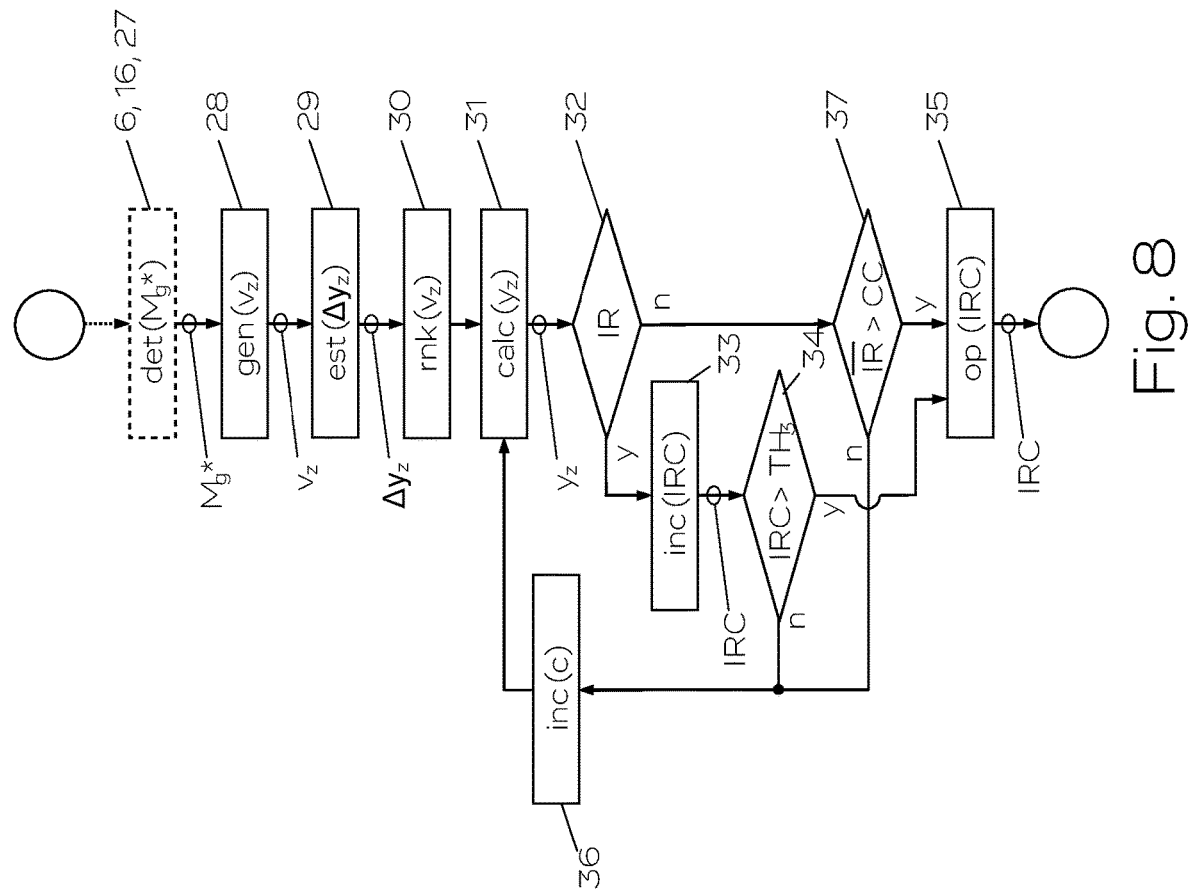
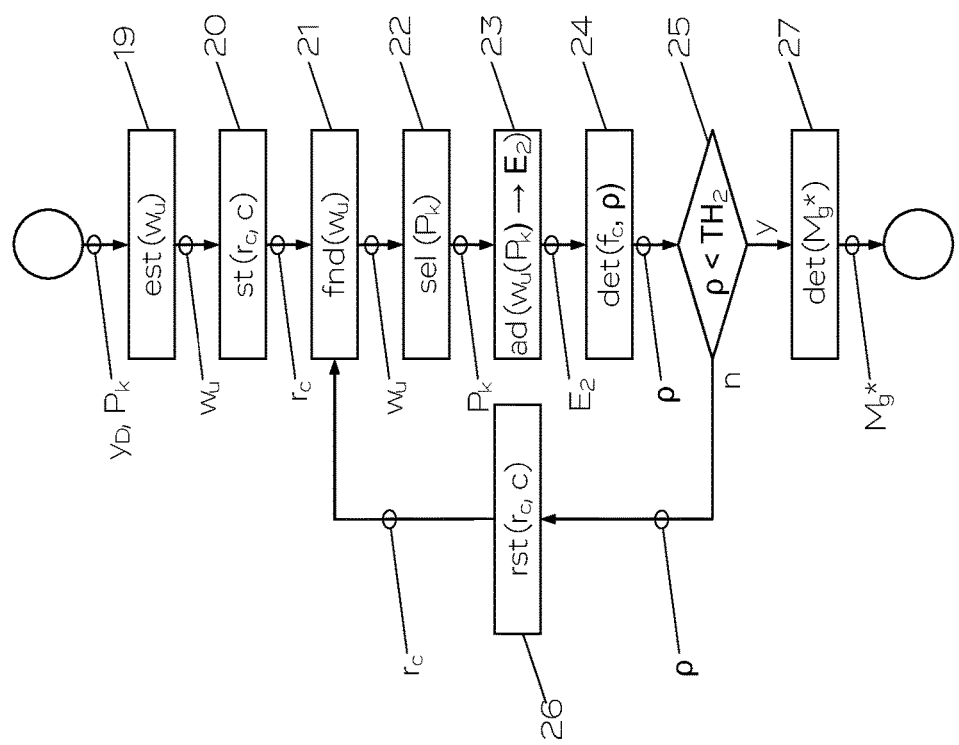

COMPUTER-IMPLEMENTED METHOD AND ELECTRONIC DEVICE FOR DETECTING INFLUENTIAL COMPONENTS IN A NETLIST REPRESENTING AN ELECTRICAL CIRCUIT

This application is a 35 U.S.C. § 371 national phase filing of International Application No. PCT/EP2019/074226, filed on Sep. 11, 2019 and claiming benefit of European Patent Application No. 18193797.0 filed on Sep. 11, 2018, wherein the disclosures of the foregoing applications are hereby incorporated by reference herein in their respective entireties.

The present invention relates to a computer-implemented method, a computer-readable medium and an electronic device for detecting, in a netlist representing an electrical circuit with electrical components subject to variations of their parameters, those components the parameter variations of which have the strongest influence on a performance of the circuit.

Electrical circuits may be of conventional discrete type or more often today of microelectronic type and sometimes comprise several thousands or even hundreds of thousands of electrical components. Each electrical component may have two or more terminals which are interconnected with terminals of some of the other components in the electrical circuit. The electrical behaviour of each component is described through a mathematical model, i.e. a "component model", which includes one or more parameters of the component. Typically, the parameters are defined in the component model used, such as the well-known BSIM model for MOSFET transistors. Other commonly used models include BSIM3, BSIM4, BSIMSOI, PSP, HICUM, or MEXTRAM. The parameters could be electrical parameters, such as threshold voltage, flat band voltage, Drain-Induced Barrier Lowering (DIBL) or subthreshold swing, as well as process parameters such as the substrate doping, gate oxide thickness, or gate length. Typically the component models offer a limited number of model parameters which should be adjusted by the designer of the circuit such as the gate length or the gate width. However, the rest of the model parameters such as the doping profiles and the gate oxide thickness depend on the semiconductor process technology and should not be touched by the designer.

When designing an electrical circuit the parameters of the components are known in advance or predefined by an electrical circuit designer. Based on the model parameters and the interconnection of the components in the electrical circuit, the performance of the electrical circuit can be calculated by the circuit simulator. The circuit simulator, e.g., "SPICE" or similar tools, mathematically solves network equations derived according to the component models, the model parameters and the component interconnections. When the calculated performance of the designed electrical circuit is satisfactory, the circuit should be ready for manufacturing.

However, due to inevitable inaccuracies in the manufacturing process of the electrical circuit and each component therein the parameters of the components are subject to variations which affect the performance of the electrical circuit. Generally, these parameter variations are characterized in form of a statistical model, e.g., a probability distribution. Hence, the variations can be simulated prior to manufacturing by calculating the performance of the electrical circuit in respect of the parameter variations. Thereby, the robustness of the design is estimated, e.g., the percentage of irregular electrical circuits, i.e., electrical circuits with unsatisfactory performance, likely to be manufactured.

A possible method is to simulate the effect of the variation of one parameter at a time (one-at-a-time, OAT) and calculate the performance of the electrical circuit for each variation; while being accurate, this method is computationally very expensive, usually not feasible for larger electrical circuits.

Another method is to generate variation samples, each of which comprises a multitude of different variations, i.e., usually randomly or pseudo-randomly varying a multitude of parameters of different components in the circuit as a testing sample; this is also referred to as Monte Carlo sampling or Monte Carlo method.

While being computationally substantially more efficient than the OAT method, the Monte Carlo method still requires a considerable amount of computational power which may be prohibitive specifically when, e.g., applied to larger electrical circuits having a huge number of components, where each Monte Carlo sample comes at a considerable computational cost, or to electrical circuits exhibiting rare events and requiring a huge number of Monte Carlo samples to be characterized.

Some concepts have been proposed to overcome the drawbacks of the Monte Carlo method. In U.S. Pat. No. 8,954,910 B1 and similarly in US 2013/0226544 A1, it is suggested to use a regression model or to apply an orthogonal matching pursuit (U.S. Pat. No. 8,954,910 B1) between the variation samples and the resulting variation in performance in order to identify components the parameter variations of which have the strongest influence on the performance of the electrical circuit. The Monte Carlo method for further analysis of the electrical circuit is then concentrated on variation samples with variations in the parameters of the thusly identified components, e.g., by ranking further variation samples (US 2013/0226544 A1).

It is an object of the invention to provide an even more efficient method for detecting, in an electrical circuit, those components the parameter variations of which have the strongest influence on a performance of the circuit, which method further allows for increased effectiveness of subsequent circuit analysis.

This and other objects are achieved by a computer-implemented method for detecting said components with the features of claim 1.

According to the invention, a computer-implemented method is provided for detecting, in a netlist representing an electrical circuit with electrical components $M_g$ subject to variations $\delta$ of their model parameters $x_j$, those components $M_g^*$ the model parameter variations $\delta$ of which have the strongest influence on a given performance metric $y_n$ of the electrical circuit, which comprises the following steps:

First, receiving, by an Interface Unit, the netlist, and extracting a topology Q of the circuit, the model parameters $x_j$ of all components $M_g$ of the circuit, and the variations $\delta$ of all model parameters. For this, standard SPICE model libraries may be used.

Then, generating, by a Sampling Unit, preferably a Monte Carlo Simulation Unit, a multitude N of variation samples $v_n$, each comprising a different set of candidate variations $x'_j$ of the model parameters $x_j$ around their standard value. Each sample $v_n$ contains variations in a number of model parameters, such as the threshold voltage or the like, for each transistor in the circuit.

Then, calculating, by a Circuit Simulation Unit, preferably using a SPICE simulator, for each variation sample $v_n$, the performance metric $y_n$ of the circuit and a deviation from a predetermined standard performance metric of the circuit, the deviations for all variation samples $v_n$ of the multitude forming a deviation vector $y_D$. This deviation vector will be of the dimension 1×N.

Prior to the following regression analysis, the topology Q of the electric circuit is analyzed by a Topology Analyzing Unit and topological patterns $P_k$ are determined. Such topological patterns in the circuit are formed by two or more electrically interconnected components $M_g$, such as interconnected transistors in a current mirror. Known methods and program libraries can be applied to identify topological patterns, such as Kirchhoff's Circuit Analysis. The identified topological patterns $P_k$ are then passed on to an Optimization Unit, which runs a numerical regression analysis, preferably an iterative orthogonal matching pursuit, on the variation samples and the deviation vector in order to detect $M_g^*$. The topological patterns are used to improve the regression analysis by introducing additional dependencies between the candidate variations $x'_j$, of the model parameters $x_j$. The dependencies might be any kind of mathematical dependency, such as weighted addition or subtraction of the parameters $x_j$ of the components which are part of the topological pattern. Typically, the kind of dependency between the model parameters $x_j$ depends on the type of topological pattern and the performance to be simulated. The Topology Analyzing Unit might take the performance to be simulated into account, for example the total power consumption of the circuit, and determine the dependencies of the topological parameters based on that performance. The invention is based on the finding that the performance of the electrical circuit is often considerably influenced by topological patterns of components in the circuit. Such topological patterns are segments in the electrical circuit where the electrical components are specifically interconnected.

Examples of topological patterns are current mirrors, differential amplifiers, voltage dividers, voltage doublers, simple latches, oscillators, or any other circuit elements known in the area of analog and digital electronic circuit design.

According to the invention, these topological patterns are used to improve the numerical regression analysis. While in state of the art methods, such as described in U.S. Pat. No. 8,954 910 B1, the regression analysis is limited to the independent candidate variations $x'_j$, of the chosen model parameters $x_j$, the method according to the invention further takes dependencies of components into account which are interconnected in above mentioned patterns. As an example, if the Gate and Drain terminals of a transistor are coupled to the Gate of a second transistor and the Source terminals of both transistors are coupled to build a current mirror, a variation in parameters (such as local deviations in the processing parameters, for example body doping) of one transistor will most likely be connected with a similar variation in the other transistor. It has been found by the inventors that taking such topology-induced dependencies into account in the regression analysis significantly reduces the computational power necessary for detecting the most influential components of the circuit.

Here, the term "performance" might denote any electrical output characteristic of the circuit as determined by the circuit simulator. The performance might be, for example, a voltage, a current, a gain, an amplification factor in terms of current or voltage amplification, a power consumption, a cutoff frequency, a bandwidth, a phase shift, a time period deduced from a transient analysis, a transfer curve, a noise, or any other output of an electrical circuit simulator. It shall be understood that the method may be applied to more than one specific performance, in which case the components the model parameter variations of which have the strongest influence on the performance are detected separately for each performance.

The detected components and their model parameter variations can subsequently be used in more effectively redesigning the electrical circuit, when necessary, e.g., by concentration on the most influential electrical components in the circuit and their model parameter variations, and/or in more effectively analysing the electrical circuit subsequently, e.g., in circuit performance analysis, sensitivity analysis etc.

Any known method of regression modelling for estimating the relationships among variables and thereby identifying said components to be detected may be considered.

It is, however, advantageous when said regression model is an iterative orthogonal matching pursuit for said detecting of the components, i.e., the detecting of the components the model parameter variations of which have the strongest influence on the performance of the circuit. The iterative method of orthogonal matching pursuit generates regression coefficients substantially in the order of influence and can therefore be stopped whenever the model becomes sufficiently accurate, which makes the orthogonal matching pursuit computationally very effective.

In an embodiment of the invention, the method comprises the following steps: A Preconditioning Unit which is integrated with or connected to the Optimization Unit generates, for each topological pattern $P_k$, at least one topological parameter $t_k$ which depends on the model parameters $x_j$ of the electrical components $M_g$ interconnected in said topological pattern $P_k$. Such dependency is based on the topological pattern and the performance to be investigated. The dependencies might be determined by from an internal or an external database containing a set of known topological patterns and their predetermined dependency with respect to a set of possible performance metrics, such as the circuit's power consumption. It might be, for example, that a topological parameter depends on the weighted model parameters of two, three, or more identified components in an additive or subtractive way. For example, the output current of a current mirror depends on the width of all transistors in the current mirror circuit. Thus, depending on the topological pattern, the topological parameter might be any mathematical relation of the model parameters of all components identified in the topological pattern.

The Preconditioning Unit then appends, to each variation sample $v_n$, for each topological parameter $t_k$, a candidate variation $t'_j$ dependent on the candidate variations $x'_j$, of the respective model parameters $x_j$ of the electrical components interconnected in said topological pattern. For example, if a topological pattern was identified to depend on two components $x_4$ and $x_7$ in either an additive or subtractive manner, the candidate variation $t'_j$ might contain the sum $x_4'+x_7'$ and the difference $x_4'-x_7'$ of the variations of these components.

The Preconditioning Unit then establishes, for each of the topological and model parameters $t'_j$ and $x'_j$, a variation vector $w_u$ comprising all candidate variations $t'_j$ and $x'_j$, of all variation samples $v_n$ of the multitude N. It then sets the deviation vector $y_D$ as a starting-point for a residual vector $r_c$ in the iterative orthogonal matching pursuit.

Further, the Optimization Unit, in each iteration step of the orthogonal matching pursuit: finds a variation vector $w_u$ which best matches the residual vector $r_c$ and adds said variation vector $w_u$ to a first group $E_1$, and determines for each variation vector $w_u$ of said first group $E_1$, a weight factor $f_c$ such that the sum of all variation vectors $w_u$ of the first group $E_1$, weighted with their respective weight factors $f_c$, approximates the deviation vector $y_D$. It then sets a remainder $\rho$ of said approximation as the residual vector $r_c$ for the next iteration step, until the remainder $\rho$ falls below a predetermined first threshold $TH_1$; and identifies the components $M_g^*$ as members of the respective variation vectors $w_u$ comprised in the first group $E_1$.

Generating topological parameters and including candidate variations of the topological parameters into each variation sample greatly enhances the efficiency of the method, as the topological or electrical parameters the variations of which have the strongest influence on the circuit's performance are readily determined and consequently the respective components are detected, e.g., by the respective weight factors. Moreover, the method is fully flexible, as topological parameter may be generated for any topological pattern. The orthogonal matching pursuit is computationally effective in approximating the deviation vector and thereby determining the weight factors. The first threshold can easily be predetermined by means of statistical methods as known in the art. When falling below said first threshold, the variation vectors in the first group immediately limit the number of components to be detected. As the variation vectors are established for each of the topological and model parameters separately and each topological and model parameter is directly related to one or more electrical components of the circuit, the components to be detected are identified by this unambiguous relation.

In an advantageous variant thereof, each topological parameter is generated according to:

$$t_k = \sum_{j}^{J_k} s_{jk} b_{jk} x_{jk}$$

with:

$t_k$ being the topological parameter of the $k^{th}$ topological pattern;

$J_k$ being a total number of model parameters the $k^{th}$ topological pattern;

$X_{jk}$ being the $j^{th}$ model parameter in the $k^{th}$ topological pattern; and $s_{jk}$, $b_{jk}$ being respective size and bias coefficients of said $j^{th}$ model parameter.

Topological parameters are thereby generated efficiently. Moreover, each topological parameter is normalized by its respective size and bias coefficients, such that the topological parameters have the same variance, i.e., the same relative influence on the performance of the circuit, as the model parameters.

A further embodiment of the method comprises the following steps:

The Preconditioning Unit which is integrated with or connected to the Optimization Unit establishes, for each of the model parameters $x_j$, a variation vector $w_u$ comprising all candidate variations $x'_j$ of all variation samples $v_n$ of the multitude N; and sets said deviation vector $y_D$ as a starting-point for a residual vector $r_c$ in said iterative orthogonal matching pursuit.

The Optimization Unit, in each iteration step of the orthogonal matching pursuit: finds a predetermined number of variation vectors $w_u$ which best match the residual vector $r_c$, selects, for each best-matching variation vector $w_u$ found, the topological pattern $P_k$ in which that electrical component $M_g$ is interconnected in, which has the model parameter $x_j$ for which said variation vector $w_u$ was established, and finds, from the selected topological patterns $P_k$, that topological pattern $P_k$ the variation vectors $w_u$ of the model parameters $x_j$ of the electrical components $M_g$ interconnected therein collectively best match the residual vector $r_c$, and adding said variation vectors $w_u$ of the found topological pattern $P_k$ to a second group $E_2$.

It then determines, for each variation vector $w_u$ of said second group $E_2$, a weight factor $f_c$ such that the sum of all variation vectors $w_u$ of said second group $E_2$, weighted with their respective weight factors $f_c$, approximates the deviation vector $y_D$, and sets a remainder $\rho$ of said approximation as the residual vector $r_c$ for the next iteration step, until the remainder $\rho$ falls below a predetermined second threshold $TH_2$. It then identifies the components $M_g^*$ as members of the variation vectors $w_u$ comprised in the second group $E_2$.

This embodiment of the method is flexible in use and can even be retrofitted into an existing setting which uses an orthogonal matching pursuit but without considering topological patterns in the circuit. It is similarly efficient as said first embodiment of the present method and effectively identifies the components to be detected by the variation vectors in said second group which via the model parameters are unambiguously related to the respective electrical components.

In a further embodiment, said step of finding that topological pattern $P_k$ the variation vectors $w_u$ of which collectively best match the residual vector $r_c$ is terminated when, for each of the selected topological patterns $P_k$, a predetermined number of variation vectors $w_u$ which best match the residual vector $r_c$ have been found. By terminating said step when having found a predetermined number of, e.g., two, three, four or more variation vectors which best match the residual vector the method can be accelerated while only insignificantly affecting the accuracy. It is, however, particularly computationally efficient and still accurate, when said predetermined number of variation vectors which best match the residual vector is two.

Preferably, said determining the weight factor comprises a method of least squares. This is a reliable and proven method. For general applicability, it is particularly advantageous when each variation vector is normalized by its variance. Thereby, the matching of the variation vectors with the deviation vector and/or residual vector is independent of possible differences in the variance values of the variations of different topological and model parameters.

The topological patterns may be determined in multiple different ways. In a favourable variant, the topological patterns are determined using a program module or library which implements a netlist analysis based on Kirchhoff's circuit laws, i.e., Kirchhoff's current law (also: "nodal rule") and Kirchhoff's voltage law (also: "loop rule").

They are applied to the topology of the electrical circuit, e.g., represented by a netlist or a matrix derived therefrom, thereby identifying the interconnections of the electrical components in the electrical circuit and, therefrom, structures of potential significance in the circuit, i.e., the topological patterns.

In an alternative or additional variant, the topological patterns are preferably determined based on a similarity to one or more predetermined target patterns. Generally, such target patterns are predefined, which were previously identified as being prone to parameter variations having strong influence on the electrical circuits performance. This results in a very effective way of determining topological patterns of high relevance. In a particularly preferred embodiment thereof each target pattern includes two or more transistors with interconnected terminals. Topological patterns with electrical components of this type and interconnections are specifically prone to variations of the model parameters.

While the variation samples may be generated by means of a diversity of methods known in the art, it is preferred that said generating the variation samples comprises Monte Carlo sampling. Monte Carlo sampling is widely recognised for solving problems in the field of probability distribution.

In a further embodiment, the method comprises the steps of:

generating, by the Sampling Unit, a multitude of further variation samples $v_z$;

estimating, by a Postprocessing Unit, for each further variation sample $v_z$, a performance deviation $\Delta y_z$ using the weight factors $f_c$ of the variation vectors $w_u$ by which said electrical components $M_g^*$ were identified;

ranking, by the Postprocessing Unit, said further variation samples $v_z$ according to said estimated performance deviations $\Delta y_z$;

calculating, by the Circuit Simulation Unit, a performance $y_z$ of the circuit (1) for each further variation sample $v_z$ in the sequence of the ranking;

comparing, by the Postprocessing Unit, the performance $y_z$ of the circuit (1) with a predetermined model performance and incrementing an irregularity count IRC with each irregularity in the circuit's calculated performance $y_z$ as compared to the model performance until either no irregularity occurs for a predetermined number of consecutive calculations or said irregularity count exceeds a predetermined third threshold $TH_3$; and outputting, by an Output Unit, the irregularity count (IRC).

Thereby, a particularly effective method for estimating a failure (or: irregularity) rate of the electrical circuit's design is achieved, which leads to an estimation on the expected waste during manufacturing of the electrical circuit.

The invention further relates to a computer-readable medium comprising computer-executable instructions causing an electronic device to perform the method according to the invention.

The invention further relates to an electronic device comprising a processing unit (such as a CPU), an electronic memory (such as a RAM or ROM), and a communication unit (such as a keyboard, a mouse, or a network interface), which is adapted to execute a method according to the invention. Such electronic device might be realized as a personal computer (PC) comprising an Interface Unit, a Sampling Unit, a Circuit Simulation Unit, an Optimization Unit, and a Topology Analyzing Unit which are adapted to perform the steps as described above. The electronic device might also comprise a Preconditioning Unit as well as a Postprocessing Unit and an Output Unit adapted to execute the steps described above. These units might be realized in electronic hardware or in software; in particular they might be realized as logic units or subroutines in the processing unit when executing a method according to the invention. The electronic device might also be part of a Client-Server environment, wherein certain units, such as the Sampling Unit and the Circuit Simulation Unit might be realized in the processing unit of the server computer, and other units, such as the Interface Unit and the Output Unit, might be realized in the CPU of a client computer. Further, the electronic device might be connected, via TCP/IP or other protocols, to a database on a server storing topological patterns, model parameters, relationships between specific performance metrics and the topological patterns, or other data.

The invention shall now be explained in more detail below on the basis of exemplary embodiments thereof with reference to the accompanying drawings, in which:

FIGS. 7 and 8 show further embodiments of the method of FIG. 1d in respective flow charts.

Figure 1A:
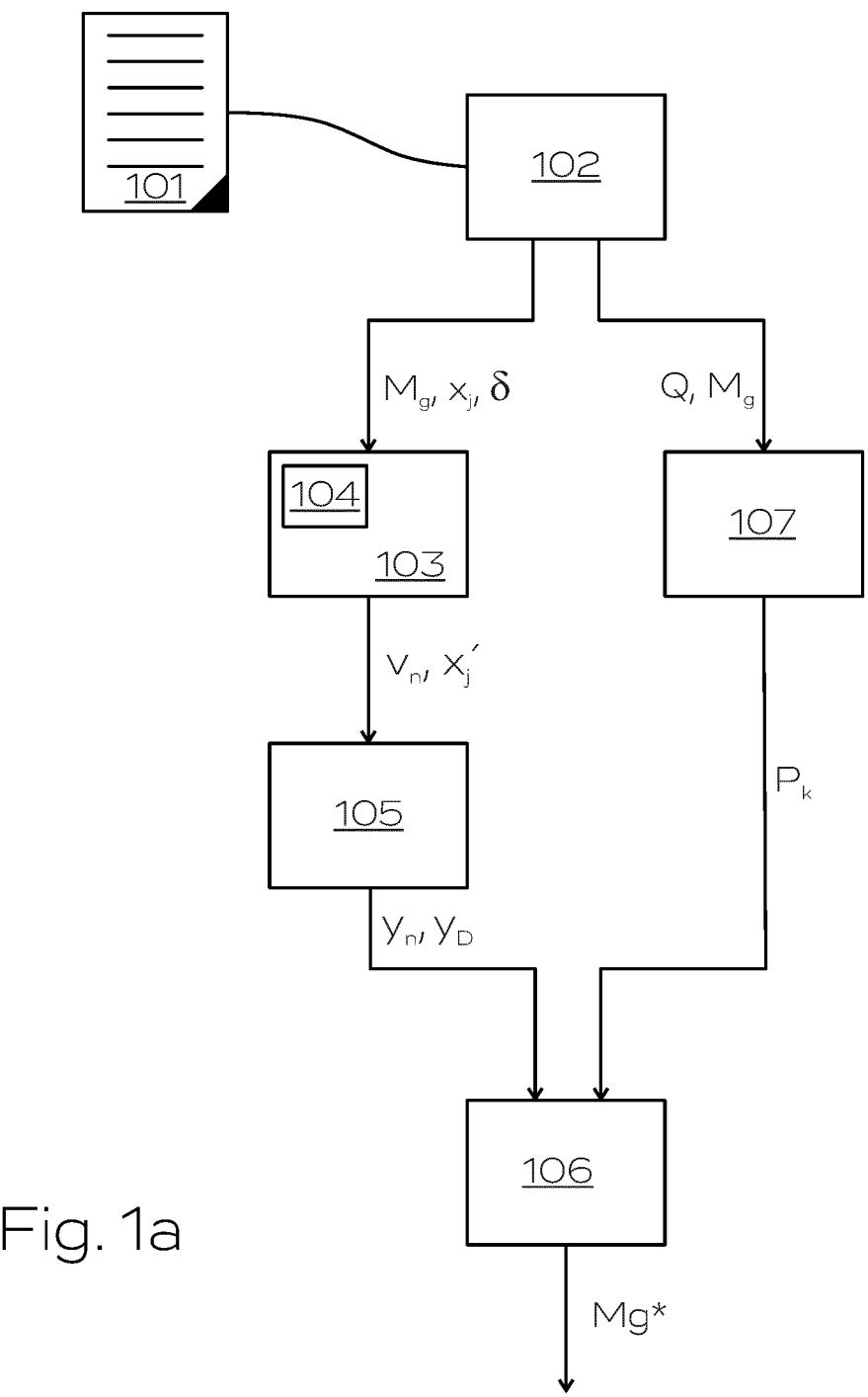
FIGS. 1a-1d show embodiments of the method of the invention in a schematic flow chart.
Figure 1B:
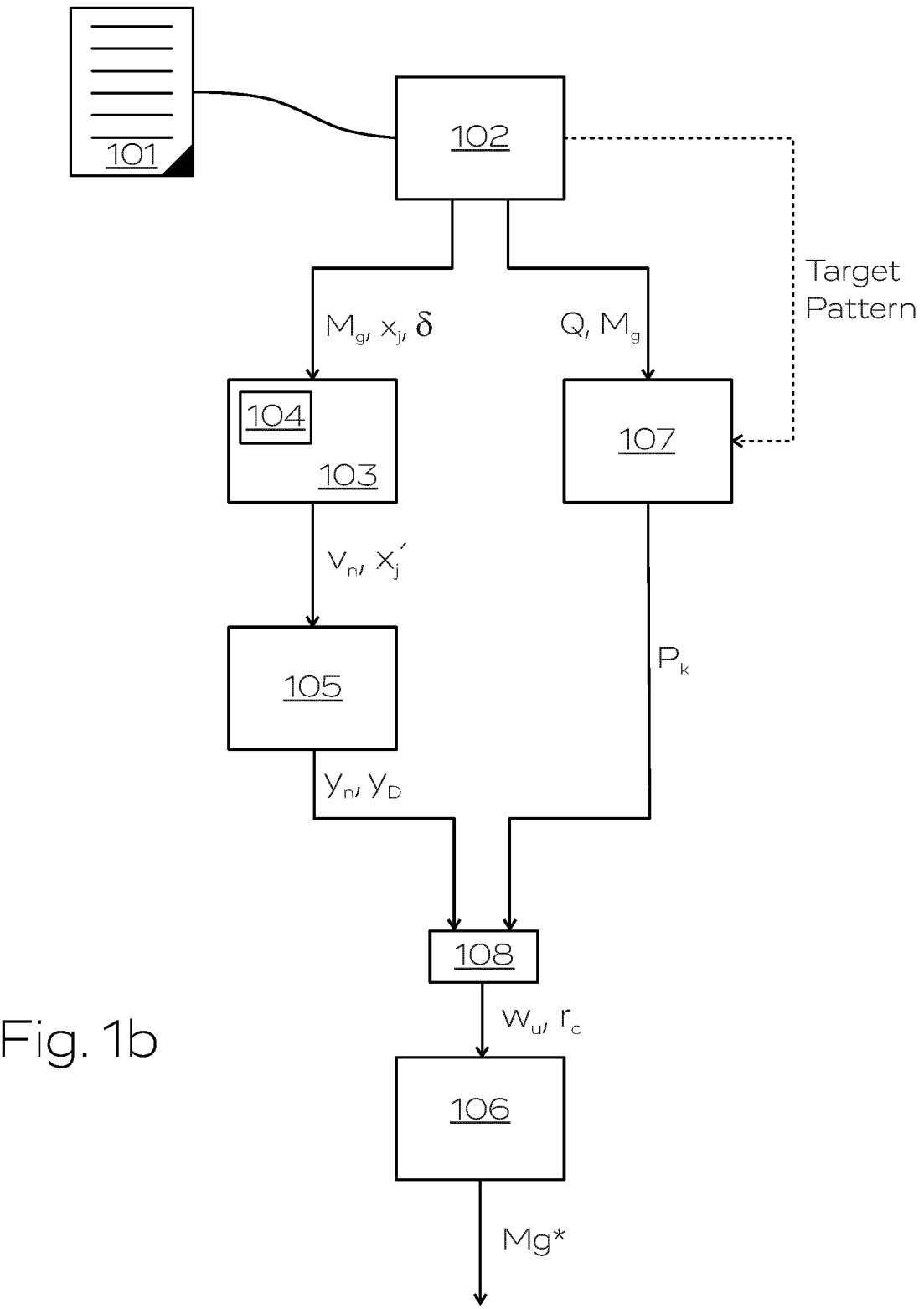
Figure 1C:
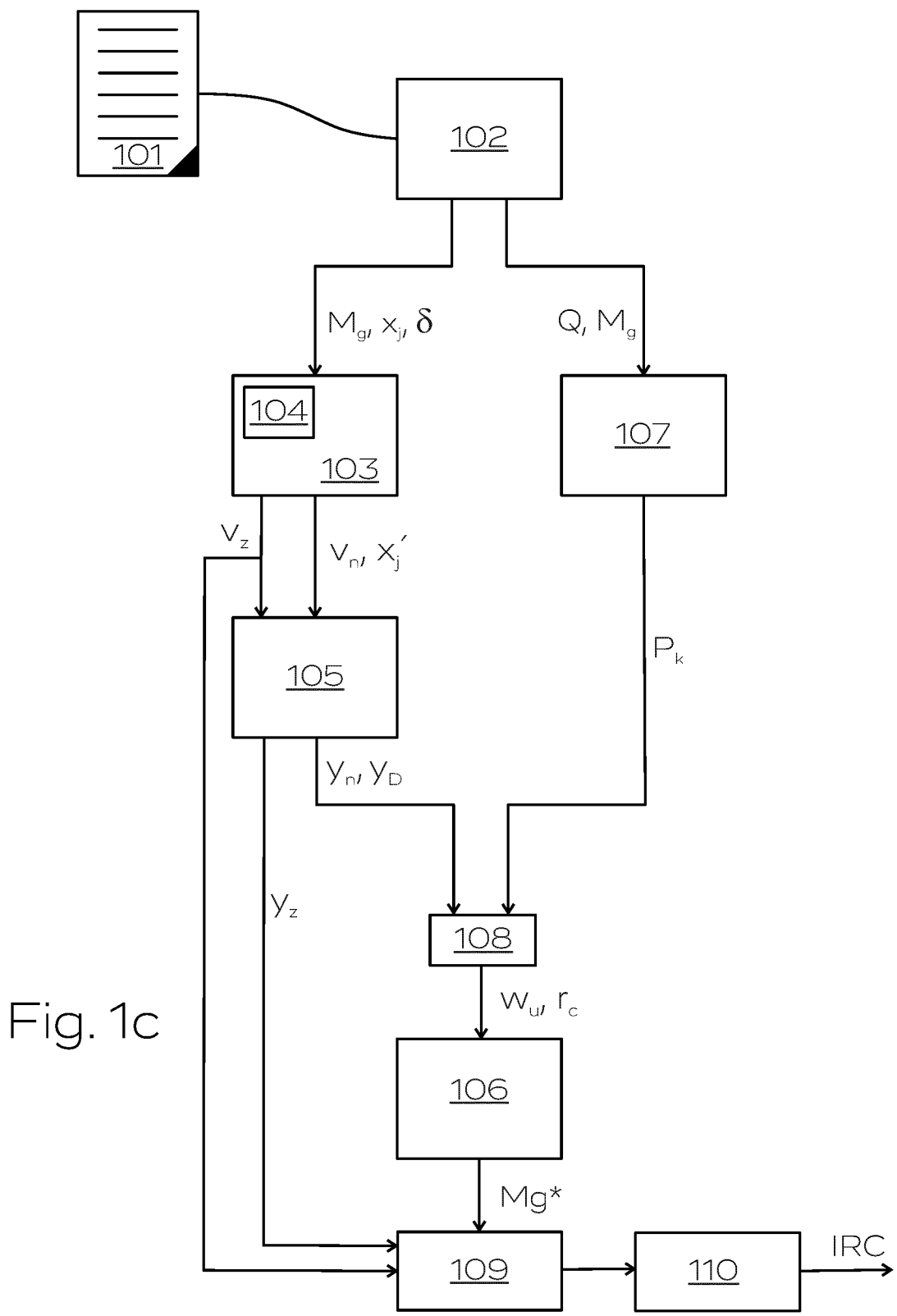
Figure 1D:
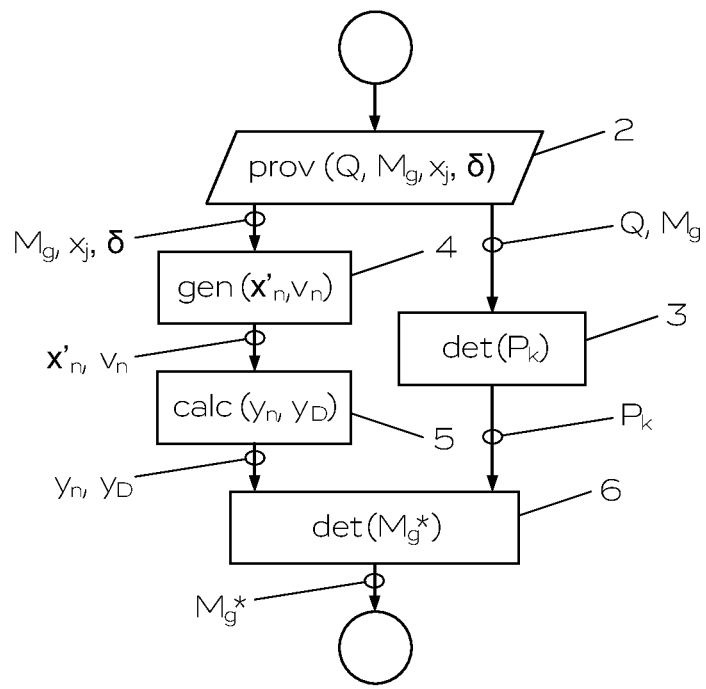
Figure 2:
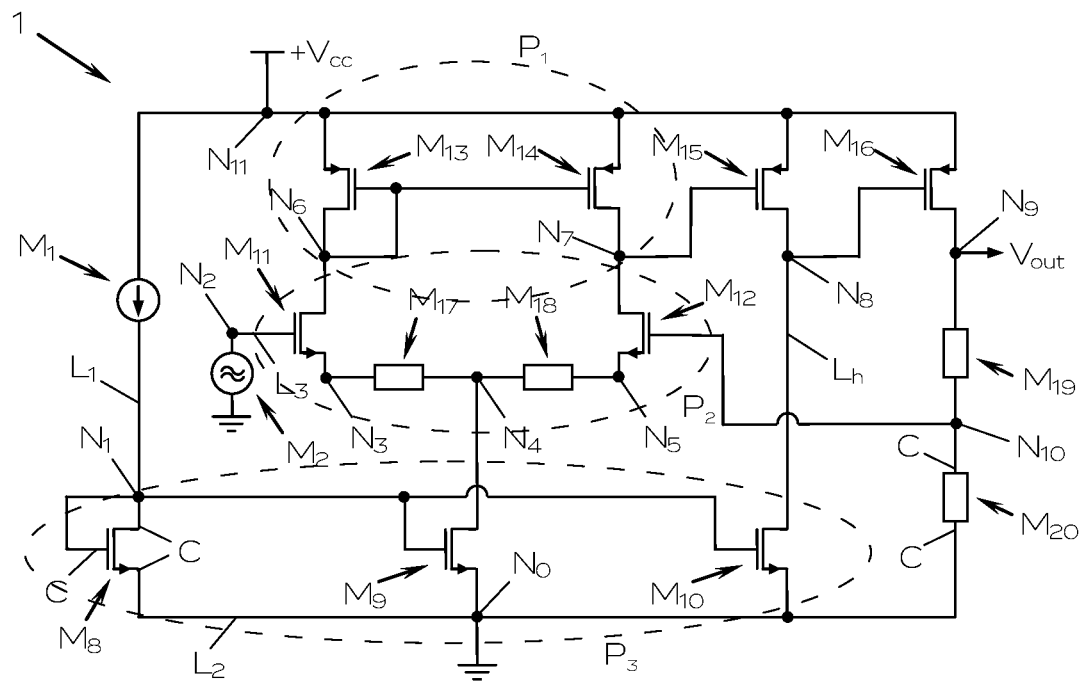
FIG. 2 shows an example for an electrical circuit with electrical components, the method of FIGS. 1a-1d is applied to, in a circuit diagram.

Based on FIGS. 1a-1d and FIG. 2, a method shall be explained which is applied to an exemplary electrical low drop-out regulator circuit 1 shown in FIG. 2. The circuit 1 has two or more electrical components $M_1$, $M_2$, ..., $M_G$, generally $M_g$, which are interconnected in the electrical circuit 1, wherein G is the total number of electrical components $M_g$ in the circuit 1. The components $M_g$ may be active, e.g., a current source $M_1$, a voltage source $M_2$, or a transistor $M_8$-$M_{16}$, or passive, e.g., a capacitor or inductor (not shown in FIG. 2), or a resistor $M_{17}$-$M_{20}$. As in the example of FIG. 2, each electrical component $M_g$ (more precisely: its terminals C) is/are interconnected with (the terminals C of) other components $M_g$ of the circuit 1 via connections $L_1$, $L_2$, ..., generally $L_h$. Where more than two components $M_g$, i.e., more than two terminals C, are interconnected the respective connections $L_h$ form nodes $N_0$, $N_1$, ..., generally $N_j$. For easier exemplification, some further nodes $N_i$ are defined in connections $L_h$ of only two interconnected components $M_g$ in the example of FIG. 2, e.g., the nodes $N_3$ and $N_5$.

It shall be understood that the term "interconnected" does not mean that each electrical component $M_i$ is connected to all other electrical components $M_i$ in the electrical circuit 1. Furthermore, the electrical circuit 1 can be represented in different ways, e.g., by a circuit diagram like the one in FIG. 2, by a netlist, by a netlist matrix or the like, as will be shown in greater detail below. All of these representations include information on a topology Q of the electrical circuit 1, i.e., the composition and interconnection of the components Mg therein.

As shown in FIG. 2, several topology patterns such as $P_1$, $P_2$, and $P_3$ can be readily identified, which are based on predetermined patterns known from electronic circuit design. For example, Gate and Drain terminals of transistor M8 are coupled to Gate and Drain terminals of transistor M9, and the Source terminals of both transistors are connected to build a current mirror circuit, as known in the art of analog electronic circuits.

The electrical properties of each electrical component $M_g$ are described by means of one or more model parameters $x_1$, $x_2$, ..., $x_J$, generally $x_j$, wherein $_J$ is the total number of model parameters $x_j$ in the electrical circuit 1. The electrical components Mg are subject to variations $\delta_1$, $\delta_2$, ..., $\delta_J$, generally $\delta$, of their model parameters $x_j$ modelling inaccuracies during manufacturing of the electrical circuit 1 and the components $M_g$ therein. The variations $\delta$ of the component's model parameters $x_j$ and their respective variation distributions are known to or defined by, e.g., an electrical circuit designer or can be estimated.

In step 2 of the method of FIG. 1d, the information on the circuit 1, i.e., the topology Q of the electrical circuit 1 and the model parameters $x_j$ of all components $M_g$ in the circuit 1, is provided by a netlist 101 which is received at interface unit 102, as shown in FIGS. 1a-1c. The netlist includes information on the model parameters xj and their variations δ.

In a subsequent step 3 topological patterns $P_1, P_2, \ldots, P_K$, generally $P_k$, of two or more interconnected electrical components $M_g$ are determined by a Topology Analyzing Unit 107 as shown in FIGS. 1a-1c, wherein K is the number of topological patterns $P_k$ determined in the circuit 1. Details on determining topological patterns $P_k$ will be explicated in greater detail below in reference to FIGS. 2 and 3. In the embodiment shown in FIG. 1b, the topological patterns are determined by comparison with target patterns provided by the Interface Unit. Such target patterns might be received from an external circuit pattern database, for example from a server running an Electronic Design Automation Platform.

A multitude N of variation samples $v_1, v_2, \ldots, V_N$, generally $v_n$, is generated in a step 4 by a Sampling Unit 103, for example a Monte Carlo Simulation Unit 104, as shown in FIGS. 1a-1c. Each variation sample $v_n$ comprises a different set of candidate variations $x'_1, x'_2, \ldots, x'_J$, generally $x'_j$, of the parameters $x_j$. The candidate variations $x'_j$ are produced in a random or pseudo-random way, e.g., by means of Monte Carlo sampling or other methods known to the skilled person. When arranging in form of a variation matrix VM for visualisation purpose, the variation samples $v_n$ can be understood as rows in the variation matrix VM, each column of which comprises the candidate variations $x'_j$ of one of the parameters $x_j$, according to:

$$VM = \begin{bmatrix} x'_{11} & \ldots & x'_{1j} & \ldots & x'_{1J} \\ \vdots & \ddots & \vdots & & \vdots \\ x'_{n1} & \ldots & x'_{nj} & \ldots & x'_{nJ} \\ \vdots & & \vdots & \ddots & \vdots \\ x'_{N1} & \ldots & x'_{Nj} & \ldots & x'_{NJ} \end{bmatrix} \quad \text{(eq. 1)}$$

wherein $x'_{nj}$, denotes the parameter's $x_j$ candidate variation $x'_j$ of the n-th variation sample $v_n$.

It shall be noted that, between consecutive steps in the flow chart of FIG. 1d (and those of FIGS. 4 and 7, likewise), some, usually newly created, information passed from one step to the next one is explicitly noted in the respective drawings for easier reference. However, all information, e.g., on components $M_g$, their parameters $x_j$, and candidate variations $x'_j$, is understood to be available throughout all steps of the method without explicit reference in the drawings.

In a subsequent step 5, a performance $y_1, y_2, \ldots, y_N$, generally $y_n$, of the electrical circuit 1 is calculated by a Circuit Simulation Unit 105 as shown in FIGS. 1a-1c; the performance being a gain, a power consumption, a bandwidth, or another characteristic of the circuit. By nature, the performance $y_n$ is influenced by the variations δ (here: candidate variations $x'_j$) of the component's $M_i$ model parameters $x_j$. This is why a separate performance $y_n$ of the circuit 1 is calculated for each variation sample $v_n$ of the multitude N.

Said calculation of the performance $y_n$ is based on the model parameters $x_j$ of the components $M_g$ and their interconnection in the circuit 1, and executed by solving both component and circuit equations derived therefrom. Usually a circuit simulator, like "SPICE", is employed for calculating (or simulating) the performance $y_n$ of the circuit 1, as known to the skilled person.

Furthermore, by the Circuit Simulation Unit 105, a deviation vector $y_D$ is formed by determining the deviation of the performance $y_n$ calculated for each variation sample $v_n$ from a standard performance $y_0$ of the electrical circuit 1 according to:

$$y_D = \begin{bmatrix} y_1 \\ \vdots \\ y_n \\ \vdots \\ y_N \end{bmatrix} - y_0 \quad \text{(eq. 2)}$$

The standard performance $y_0$ may either be determined as the performance of the electrical circuit 1 without any variations δ in the parameters $x_j$ or as an average value of the calculated performance $y_n$ according to $y_0=(y_1+\ldots+y_N)/N$.

As depicted by the two parallel branches in FIGS. 1a-1d, the execution of step 3 and the execution of steps 4 and 5 are independent from each other.

In subsequent step 6, the variation samples $v_n$, the calculated deviation vector $y_D$, and the topological patterns $P_k$ are used in a regression model by an Optimization Unit 106 as shown in FIGS. 1a-1c which can estimate the relationships among variables as known in the art, e.g. in an orthogonal matching pursuit. An orthogonal matching pursuit is an iterative approximation method, details of which will be explicated below with respect to FIGS. 4 and 7. Thereby, those electrical components $M_g$* of the circuit 1 are detected, the model parameters $x_j$ of which have the strongest influence on the performance $y_n$ of the circuit 1. As each candidate variation $x'_j$ is directly related to the respective parameter $x_j$ and each parameter $x_j$ is directly related to the respective electrical component $M_g$, each candidate variation $x'_j$ unambiguously identifies a respective electrical component $M_g$.

Figure 3:
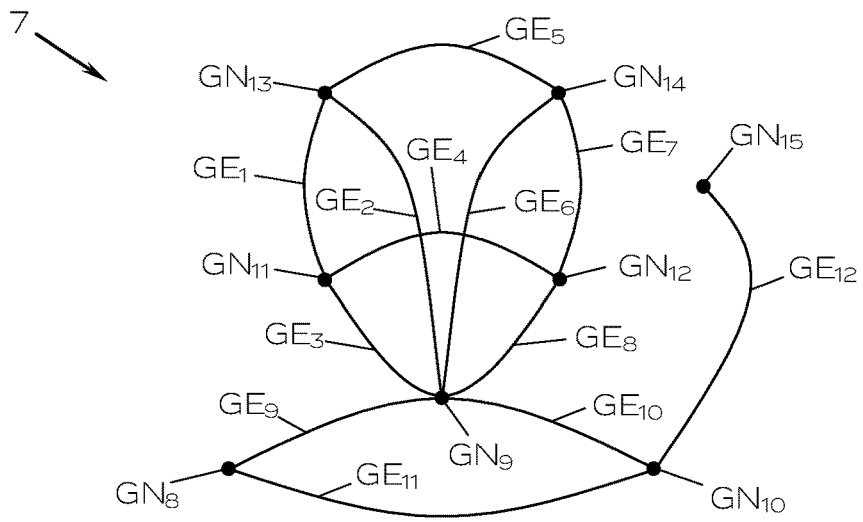
FIG. 3 shows the electrical circuit of FIG. 2 in a graph representation diagram.

Based on the exemplary circuit 1 of FIGS. 2 and 3, it shall now be exemplified how to determine a topological pattern $P_k$ in the circuit 1 according to step 3.

As previously mentioned, the topology of the electrical circuit 1 may be given, e.g., by a netlist which contains the information regarding the topological properties of the circuit 1 corresponding to the connections $L_h$ between the components $M_g$ including the nodes $N_i$. In the netlist, each component's $M_g$ terminal C is identified with a unique node $N_i$ and every node $N_i$ is identified by one or more component's terminals C.

In general, a topological pattern $P_k$ is determined by means of Kirchhoff's circuit laws, i.e., by applying Kirchhoff's voltage law (KVL) to find KVL patterns or Kirchhoff's current law (KCL) to find KCL patterns or any combination of different KVLs (or KCLs) on the electrical circuit 1, such that more than one individual component $M_g$ with one or more model parameters $x_j$ which are subject to variations δ are included. Therefore, any loop or cut-set finder algorithm used in graph theory may be used to find KVL patterns and KCL patterns and determine, therefrom, topological patterns $P_k$. Alternatively or in addition, the topological patterns $P_k$ may be determined by checking the electrical circuit 1 or segments thereof for similarity to one or more predetermined target patterns, e.g., two or more transistors $M_g$ with interconnected terminals.

As an example, a netlist matrix A (eq. 3) representing the exemplary electrical circuit 1 in FIG. 2 may be created from the netlist (or the circuit diagram 1). In the thusly created netlist matrix A, the components $M_g$ correspond to the columns (from left to right: $M_8$, $M_9$, $M_{10}$, $M_{11}$, $M_{12}$, $M_{13}$, $M_{14}$, $M_{15}$, $M_{16}$, $M_1$, $M_2$, $M_{19}$, $M_{20}$, $M_{17}$, $M_{18}$) and the different nodes Ni correspond to the rows (from top to bottom: $N_0$ to $N_{11}$).

$$A = \begin{bmatrix} S & S & S & 0 & 0 & 0 & 0 & 0 & 0 & 0 & -1 & 0 & -1 & 0 & 0 \\ GD & G & G & 0 & 0 & 0 & 0 & 0 & 0 & -1 & 0 & 0 & 0 & 0 & 0 \\ 0 & 0 & 0 & G & 0 & 0 & 0 & 0 & 0 & 0 & +1 & 0 & 0 & 0 & 0 \\ 0 & 0 & 0 & S & 0 & 0 & 0 & 0 & 0 & 0 & 0 & 0 & 0 & +1 & 0 \\ 0 & D & 0 & 0 & 0 & 0 & 0 & 0 & 0 & 0 & 0 & 0 & 0 & -1 & +1 \\ 0 & 0 & 0 & 0 & S & 0 & 0 & 0 & 0 & 0 & 0 & 0 & 0 & 0 & -1 \\ 0 & 0 & 0 & D & 0 & GD & G & 0 & 0 & 0 & 0 & 0 & 0 & 0 & 0 \\ 0 & 0 & 0 & 0 & D & 0 & D & G & 0 & 0 & 0 & 0 & 0 & 0 & 0 \\ 0 & 0 & D & 0 & 0 & 0 & D & G & 0 & 0 & 0 & 0 & 0 & 0 & 0 \\ 0 & 0 & 0 & 0 & 0 & 0 & 0 & D & 0 & 0 & +1 & 0 & 0 & 0 & 0 \\ 0 & 0 & 0 & 0 & G & 0 & 0 & 0 & 0 & 0 & -1 & +1 & 0 & 0 & 0 \\ 0 & 0 & 0 & 0 & 0 & S & S & S & S & +1 & 0 & 0 & 0 & 0 & 0 \end{bmatrix}$$ (eq. 3)

In eq. 3 zero values in the matrix are depicted as "o" for better visibility of the non-zero values, "S" denotes a connection to a source terminal C of a transistor (component) $M_g$ in the circuit 1, likewise, "G" and "D" denote connections to a gate or drain terminal C, respectively, and "−1" and "+1" denote a sign of a voltage or current at the respective terminal C. Using this information, the topological patterns $P_k$ can be determined.

When, for example, considering distributions of the variations δ of model parameters $x_j$ of transistor components $M_g$, a topological pattern $P_k$ has to include at least two transistors. In the following, possible ways to obtain the topological patterns $P_k$ are explicated.

To obtain KCL patterns, first KCLs at all nodes N, are considered (nodal KCLs). Then combinatorial KCLs are optionally formed by combining the nodal KCLs with common components $M_g$. Afterwards, a further optional combining iteration is performed on the previously obtained combinatorial KCLs by combining the combinatorial KCLs with common nodes $N_i$, and these iterations are continued until a stop condition is met. A possible stop condition when determining the topological patterns $P_k$ is to have no common nodes $N_i$ between the obtained combinatorial KCLs left, or, when said determination is based on a least squares method, to have the number of components Mg with varying parameters $x_j$ in the combinatorial KCLs equalling or exceeding the number of variation samples $v_n$.

Accordingly, for the electrical circuit 1 of FIG. 2, the KCL patterns may be found based on the following (with a current $I_{Mg}$ denoting the electrical current flowing through the respective component $M_g$ in the circuit 1 of the example of FIG. 2):

(i) Nodal KCLs:
$N_0$: KCL is not meaningful
$N_1$: corresponding to $I_{M8}-I_{M1}=0$
$N_2$: corresponding to $I_{M2}=0$
$N_3$: corresponding to $I_{M11}-I_{M17}=0$
$N_4$: corresponding to $I_{M17}-I_{M18}-I_{M9}=0$
$N_5$: corresponding to $I_{M18}+I_{M12}=0$
$N_6$: corresponding to $I_{M13}-I_{M11}=0$
$N_7$: corresponding to $I_{M14}-I_{M12}=0$
$N_8$: corresponding to $I_{M15}-I_{M10}=0$
$N_9$: corresponding to $I_{M16}-I_{M19}=0$
$N_{10}$: corresponding to $I_{M19}-I_{M20}=0$
$N_{11}$: KCL is not meaningful (ii) Combinatorial KCLs—The First Combining Iteration Based on Common Components $M_g$:
$N_3$ and $N_4$: corresponding to $I_{M11}-I_{M18}-I_{M9}=0$
$N_3$ and $N_6$: corresponding to $I_{M13}-I_{M17}=0$
$N_4$ and $N_5$: corresponding to $I_{M17}-I_{M9}+I_{M12}=0$
$N_5$ and $N_7$: corresponding to $I_{M18}+I_{M14}=0$
$N_9$ and $N_{10}$: corresponding to $I_{M16}-I_{M20}=0$ (iii) Combinatorial KCLs—Second Combining Iteration Based on Common Nodes $N_i$:
$N_3$, $N_4$ and $N_6$: corresponding to $I_{M13}-I_{M18}-I_{M9}=0$
$N_3$, $N_4$ and $N_5$: corresponding to $I_{M11}-I_{M9}+I_{M12}=0$
$N_4$, $N_5$ and $N_7$: corresponding to $I_{M17}-I_{M9}+I_{M14}=0$ (iv) Combinatorial KCLs—Third Combining Iteration again Based on Common Nodes $N_i$:
$N_3$, $N_4$, $N_5$, $N_6$, and $N_7$: corresponding to $I_{M13}+I_{M14}-I_{M9}=0$ It should be noted that the KCLs on the nodes $N_0$ and $N_{11}$ are not considered as meaningful. Furthermore, the current through the gates of the transistors $M_g$ are supposed to be zero. This may not be a general rule, however, it could be considered as a fair approximation as usually variations δ affect the biasing and can be explained as small direct current (DC) signal effects.

From the above-mentioned twenty-one KCLs, only nine KCLs include more than one component $M_g$ which have, in this example, varying parameters $x_j$ and therefore the number of all possible topological patterns $P_k$ obtained by means of KCL is limited to nine: ($M_{11}$, $M_{13}$), ($M_{12}$, $M_{14}$), ($M_{10}$, $M_{15}$), ($M_{11}$, $M_9$), ($M_9$, $M_{12}$), ($M_9$, $M_{13}$), ($M_{11}$, $M_9$, $M_{12}$), ($M_9$, $M_{14}$), and ($M_9$, $M_{13}$, $M_{14}$)

In order to obtain KVL patterns, the ideal voltage and current sources are replaced with short and open circuits, respectively, and the electrical circuit 1 (here: the netlist matrix A of eq. 2) is explored to find loops including more than one gate-source (GS) of transistor components $M_g$. Thereby, we obtain the KVL patterns (with a voltage $V_{Gsg}$ denoting a gate-source voltage at the respective transistor Mg and a voltage $V_{Mg}$ denoting a voltage at the respective general component $M_g$ in the circuit 1 of the example of FIG. 2) as:

($M_8$, $M_9$): corresponding to $V_{GS8}-V_{GS9}=0$
($M_8$, $M_{10}$): corresponding to $V_{GS8}-V_{GS10}=0$
($M_9$, $M_{10}$): corresponding to $V_{GS9}-V_{GS10}=0$
($M_{13}$, $M_{14}$): corresponding to $V_{GS13}-V_{GS14}=0$
($M_{11}$, $M_{12}$): corresponding to $-V_{M2}+V_{GS11}+V_{M17}+V_{M18}-V_{GS12}+V_{M20}=0$ It shall be noted that, for example, $-V_{CC}+V_{GS13}+V_{DS11}+V_{M17}+V_{DS}9=0$ (with a voltage $V_{Dsg}$ denoting a drain-source voltage at the respective transistor $M_g$), while being a meaningful KVL, is not considered as a KVL pattern in the present case as it does not include two or more gate-source voltages but merely two drain-source (DS) voltages.

Now, as all KCL and KVL patterns have been obtained, these patterns may be combined to avoid redundancy or to obtain more comprehensive and effective topological patterns $P_k$. This may be performed, e.g., by forming a graph 7 (FIG. 3) in which nodes $GN_8$, $GN_9$, . . . , generally GN, correspond to all components $M_g$, which form the KCL and KVL patterns, and in which edges $GE_1$, $GE_2$, ..., generally GE, between two nodes GN indicate that the respective nodes GN belong to the same KCL or KVL pattern.

In the present example, the graph 7 is obtained from the KCL and KVL patterns. This graph shows all KCL and KVL pattern based relationships between the components $M_g$ with varying parameters $x_j$. It may, alternatively, be obtained directly from the netlist matrix A by exploring all columns and extracting meaningful KCLs and KVLs, which include columns that correspond to a component $M_g$ with one or more varying parameters $x_j$. In this very case, the corresponding edges GE may be added to the graph 7 of FIG. 3.

Topological patterns $P_k$ which are even more comprehensive than the KCL and KVL patterns are, e.g., determined based on a similarity to one or more predetermined target patterns, which may be more or less extensive, or by means of a loop finder algorithm with appropriate constraints, as known to the skilled person.

Figure 4:
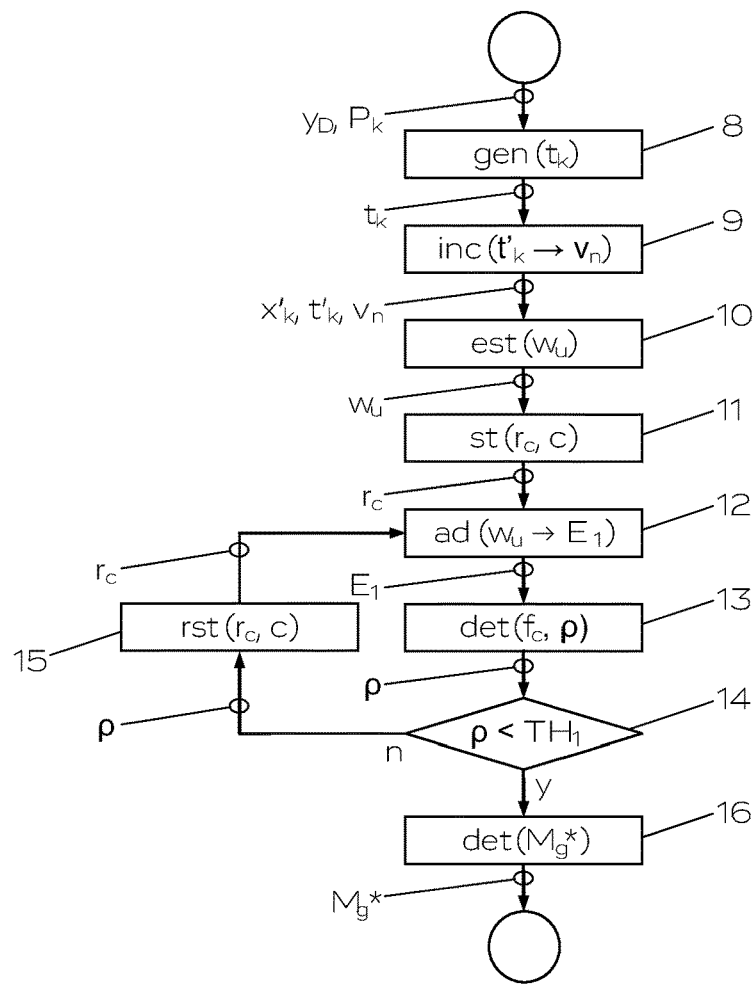
FIG. 4 shows an embodiment of the method of FIG. 1d in a flow chart.

In the optional embodiments of FIG. 4 and FIG. 1*b*, step 6 of the present method comprises the following steps.

In step 8 subsequent to steps 3 and 5 (FIG. 1*d*), at least one topological parameter $t_k$ is generated for each topological pattern $P_k$. Each topological parameter $t_k$ is composed of the model parameters $x_j$ of the components $M_g$ interconnected in the respective topological pattern $P_k$, as will be exemplified in greater detail below. As a consequence of the model parameters $x_j$ being subject to variations δ, the topological parameters $t_k$ are likewise subject to variations.

Hence, in subsequent step 9 a candidate variation $t'_k$ is calculated for each topological parameter $t_k$ and for each variation sample $v_n$, from all variations δ of the model parameters $x_j$ of the components $M_g$ interconnected in the respective topological pattern $P_k$. The candidate variations $t'_k$ of the topological parameters $t_k$ are then included into the respective variation sample $v_n$, for which they were calculated. The variation matrix VM of eq. 1 (set up for visualisation purpose) can thereby be expanded according to:

$$VM = \begin{bmatrix} x'_{11} & \cdots & x'_{1j} & \cdots & x'_{1J} & t'_{11} & \cdots & t'_{1k} & \cdots & t'_{1K} \\ \vdots & \ddots & \vdots & & \vdots & \vdots & \ddots & \vdots & & \vdots \\ x'_{n1} & \cdots & x'_{nj} & \cdots & x'_{nJ} & t'_{n1} & \cdots & t'_{nk} & \cdots & t'_{nK} \\ \vdots & & \vdots & \ddots & \vdots & \vdots & & \vdots & \ddots & \vdots \\ x'_{N1} & \cdots & x'_{Nj} & \cdots & x'_{NJ} & t'_{N1} & \cdots & t'_{Nk} & \cdots & t'_{NK} \end{bmatrix} \quad \text{(eq. 4)}$$

In subsequent step 10, a variation vector $w_1$, $w_2$, ..., $w_u$, generally $w_u$, (with U=J+K) is established for each of the topological and model parameters $t_k$, $x_j$. Each variation vector $w_u$ comprises all candidate variations $t'_k$, $x'_j$, of one of the topological and model parameters $t_k$, $x_j$, i.e., all the topological or model parameter's candidate variations $t'_k$, $x'$, of all variation samples $v_n$, of the multitude N. Hence, in the variation matrix VM of eq. 4 the variation vectors $w_u$ form the columns. Optionally, each variation vector $w_u$ is normalized by its variance.

Next, in step 11 said deviation vector $y_D$ generated in step 5 (FIG. 1*d*) is set as a starting-point, i.e., initial value or vector, for a residual vector $r_c$ in said iterative orthogonal matching pursuit, wherein the iteration counter c is set to its starting value. In each iteration step of the orthogonal matching pursuit the following sub-steps are performed:

In sub-step 12, from the variation vectors $w_u$ that variation vector $w_u$ is searched and found which best matches the residual vector $r_c$, i.e., is most similar thereto. This can be achieved, e.g., by a correlation of each variation vector $w_u$ and the residual vector $r_c$ and comparing the resulting correlation coefficients, or by a dot product of each variation vector $w_u$ and the residual vector $r_c$. Said best matching variation vector $w_u$ is added to a first group $E_1$.

In sub-step 13, a weight factor $f_c$ is determined for each variation vector $w_u$ of said first group $E_1$, e.g., by means of a method of least squares, such that the sum of all variation vectors $w_u$ of the first group $E_1$ when weighted with their respective weight factor $f_c$ approximates the deviation vector $y_D$. Hence, after two or more iterations of the orthogonal matching pursuit, a corresponding number of two or more variation vectors $w_u$ are in the first group $E_1$, and a respective weight factor $f_c$ is determined for each variation vector $w_u$ anew in each iteration such that the deviation vector $y_D$ is best approximated.

In a decision sub-step 14, it is investigated whether a remainder ρ of this approximation, i.e., the difference between the approximation and the deviation vector $y_D$, has fallen below a predetermined first threshold $TH_1$; when this is not the case (branch "n" in FIG. 4), i.e., the remainder ρ is still too large, the iterative orthogonal matching pursuit is continued by setting, in sub-step 15, said remainder ρ as the new residual vector $r_c$ for the next iteration step, incrementing the counter c and returning to sub-step 12.

When, on the other hand, the remainder ρ has fallen below said threshold $TH_1$ (branch "y" in FIG. 4), the orthogonal matching pursuit is completed in step 16 and the electrical components $M_g^*$ to be detected are identified by means of the respective variation vectors $w_u$ comprised in said first group E1. When desired, the detected electrical components $M_g^*$ may optionally be ranked, e.g., based on the respective weight factor $f_c$ determined for each variation vector $w_u$ in the first group $E_1$ during the final iteration step.

This identification is unambiguous as mentioned earlier: Each candidate variation $x'_j$, and, likewise, each variation vector $w_u$ is directly related to a respective topological and/or model parameter $t_k$, $x_j$, each topological parameter $t_k$ being directly related to the respective model parameters $x_j$ of the components $M_g$ in the corresponding topological pattern $P_k$, and each model parameter $x_j$ is directly related to an electrical component $M_g$; consequently the electrical components $M_g$ are unambiguously identified by the variation vectors $w_u$ comprised in the first group $E_1$.

Said threshold $TH_1$ is predetermined based on statistical rules known to the skilled person.

It shall be noted that the iteration may optionally be terminated when the number of iterations equals said multitude N of variation samples $v_n$.

Figure 5:
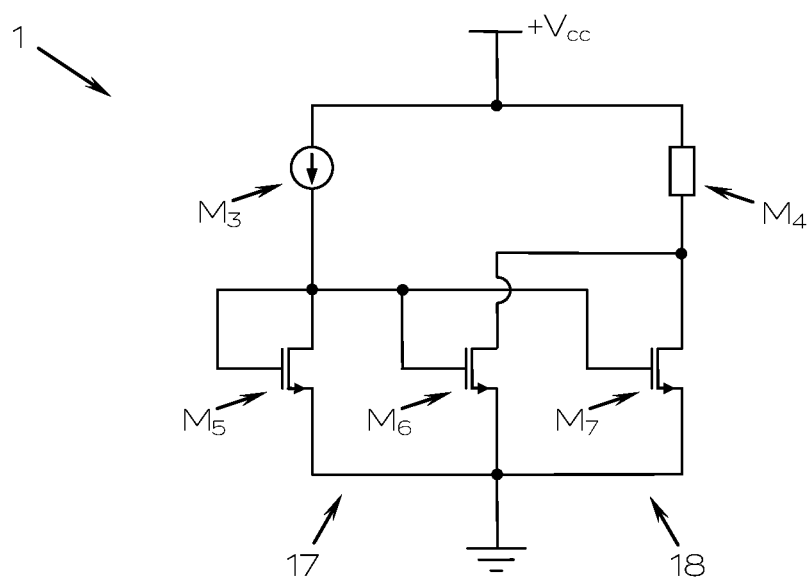
FIG. 5 shows another example for an electrical circuit with electrical components, the method of FIG. 1d is applied to, in a circuit diagram.

Based on the exemplary current mirror circuit 1 of FIG. 5 and the FIGS. 6*a* to 6*j*, some variants on how to generate the topological parameters $t_k$ shall now be explicated.

The electrical circuit 1 according to the example of FIG. 5 comprises three transistors $M_5$, $M_6$, and $M_7$ which pairwise, i.e., $M_5$ and $M_6$ on the one hand and $M_5$ and $M_7$ on the other, form a first and a second current mirror 17, 18, respectively, wherein transistors $M_5$, $M_6$, $M_7$ shall have different sizes, i.e., different gate-length (here: "GL" and/or gate-width (here: "GW"). The first current mirror 17 (corresponding to the transistors $M_5$ and $M_6$) copies a current proportional (ideally equal) to a current $I_{M3}$ of current source $M_3$ times the ratios of the respective gate-lengths and gate-widths according to $I_{M3} \times (GW_{M6}/GL_{M6})/(GW_{M5}/GL_{M5})$ at the drain of the transistor $M_6$, wherein $GW_{Mg}$ and $GL_{Mg}$ denote the gate-width and gate-length of the respective electrical component $M_g$. Likewise, the second current mirror 18 (corresponding to the transistors $M_5$ and $M_7$) copies a current proportional (ideally equal) to $I_{M3} \times (GW_{M7}/GL_{M7})/(GW_{M5}/GL_{M5})$ at the drain of the transistor $M_7$.

In this example, gate-lengths $GL_{M5}$, $GL_{M6}$, $GL_{M7}$ of the transistors $M_5$, $M_6$, $M_7$ shall be equal ($GL_{M5}=GL_{M6}=GL_{M7}$) which is usual, while the gate-widths $GW_{M5}$, $GW_{M6}$, $GW_{M7}$ shall differ according to $GW_{M5}=3 \times GW_{M6}=2 \times GW_{M7}$. Therefore, the currents at the drains of the transistors $M_6$ and $M_7$ are proportional (ideally equal) to $I_{M3}/3$ and $I_{M3}/2$, respectively.

In the electrical circuit 1 of FIG. 5 where the gates and sources of three transistors $M_5$, $M_6$, $M_7$ are connected in parallel, the topological information corresponds to three possible KVLs and the topological parameters $t_k$ may be defined as all possible pair-wise combinations of model parameters $x_5$, $x_6$, $x_7$ of the transistors $M_5$, $M_6$, $M_7$ given by $x_5 \pm x_6$, $x_5 \pm x_7$ and $x_6 \pm x_7$, accordingly. However, the sizes of transistors $M_5$, $M_6$, $M_7$ are different in this example (i.e., $GW_{M5} \neq GW_{M6} \neq GW_{M7}$) and the contribution of a varying parameter $x_j$ is a function of the component's size. Thus, the topological parameters $t_k$ may optionally be modified, i.e., normalized, by defining a corresponding size-coefficient $s_j$ for each varying parameter $x_j$ as $s_j=1/\sqrt{GA}$ where GA denotes the component's area, i.e., $GA=GW \times GL$. It is important to note that the size-coefficient $s_j$ depends on the technology of the respective component $M_g$ and the distribution of its variation $\delta$.

In the 0.35 μm technology used in this example, the model parameters' variations $x_j$ are drawn from normal distributions with zero mean values and a given variance. However, in other circumstances the effect of variations $x_j$ may depend on the component's area and result in performance variations characterized by a variance inversely proportional to the component's area ($GA=GW \times GL$), where $GA_5=GW_{M5} \times GL_{M5}$, $GA_6=GW_{M6} \times GL_{M6}$, and $GA_7=GW_{M7} \times GL_{M7}$. When, for example, two transistors $M_g$ are topologically connected (e.g. contributing to the same KVL) and both have the same size, similar contributions by their corresponding varying parameters $x_j$ to the performance $y_n$ of the circuit 1 are expected. However, when one of the transistors $M_g$ has a larger area, a smaller contribution by the model parameters $x_j$ of this transistor $M_g$ is expected when compared to that of a transistor $M_g$ with a smaller area. This is why said optional size-coefficient $s_j$ is defined to obtain the topological parameter $t_k$ accurately and take the relative contributions into account.

It shall be understood that different biasing conditions may also affect the relative contributions, such that for each transistor $M_5$, $M_6$, $M_7$ a further coefficient (the bias-coefficient) ID, may optionally be used which, however, usually has a smaller effect as compared to the effect of having different size of transistors $M_g$.

Moreover, more than one model parameter $x_j$ may—or usually will—be defined and taken into account per component $M_g$, e.g., when the component $M_g$ is a transistor. In this regard, it shall be noted, that the parameters $x_j$ are generally based on physical values and may, e.g., correspond to a threshold voltage and/or a current factor etc., respectively.

In the example of FIGS. 5 and 6 for taking the geometry of the components $M_g$ into account, the size-coefficients $s_j$ are used to generate the topological parameters $t_k$ as $x_5/\sqrt{GA_5} \pm x_6/\sqrt{GA_6}$, $x_5/\sqrt{GA_5} \pm x_7/\sqrt{GA_7}$ and $x_6/\sqrt{GA_6} \pm x_7/\sqrt{GA_7}$. With the sizes of the present example ($GL_{M5}=GL_{M6}=GL_{M7}$, $GW_{L5}=3 \times GW_{L6}=2 \times GW_{L7}$), the topological parameters $t_k$ can be simplified to $(X_5 \pm \sqrt{3}x_6)/2$, $(x_5 \pm \sqrt{2}x_7)/\sqrt{3}$ and $(\sqrt{3}x_6 \pm \sqrt{2}x_7)/\sqrt{5}$. The thusly created topological parameters $t_k$ have the same variance, i.e., the same relative influence on the performance $y_n$ of the circuit 1, as the model parameters $x_j$.

The performance $y_n$ of the electrical circuit 1 of FIG. 5 is calculated from the electrical current $I_{M4}$ through the resistor (component) $M_4$, which ideally is equal to $5 \times I_{M3}/6$. The respective results of the calculation of the circuit's performance $y_n$ (here: $I_{M4}/I_{M3}$) using a Monte Carlo simulation (based on 0.35 μm CMOS technology) of the distributions of variations $\delta$ of the topological and model parameters $t_k$, $x_j$ are plotted in the scatterplot diagrams of FIGS. 6a to 6j for visualisation purpose. FIGS. 6d to 6i demonstrate that some of the topological parameters $t_k$—specifically: $(x_5-\sqrt{3}x_6)/2$, $(x_5-\sqrt{2}x_7)/\sqrt{3}$ and $(\sqrt{3}x_6+\sqrt{2}x_7)/\sqrt{5}$ having all calculation results distributed around a diagonal in the respective scatterplot diagrams of FIGS. 6d, 6e, and 6i—capture more clear and measurable dependencies as compared to, e.g., the model parameters $x_5$, $x_6$, and $x_7$, solely, the respective scatterplots of which show rather random distribution in FIGS. 6a to 6c.

In fact, by testing all (KVL-based) pair-wise combinations to find topological patterns $P_k$ and to generate topological parameters $t_k$ therefor, it is found that the combinations ($x_5$ and $x_6$) and ($x_5$ and $x_7$) inversely contribute to the performance $y_n$ while the combination ($x_6$ and $x_7$) contribute to the performance $y_n$ in a similar manner. Consequently a combination of KVLs to form a topological pattern $P_k$ with all three components $M_5$, $M_6$, $M_7$ and, thus, a three-component topological parameter $t_k$ shall be considered in the present example based on the gate-source voltages $V_{GSg}$ of the respective components $M_g$ as $V_{GS5}-V_{GS6}=0$ and $V_{GS5}-V_{GS7}=0$, hence $2 \times V_{GS5} (V_{GS6}+V_{GS7})=0$.

Figures 6A, 6B, 6C:
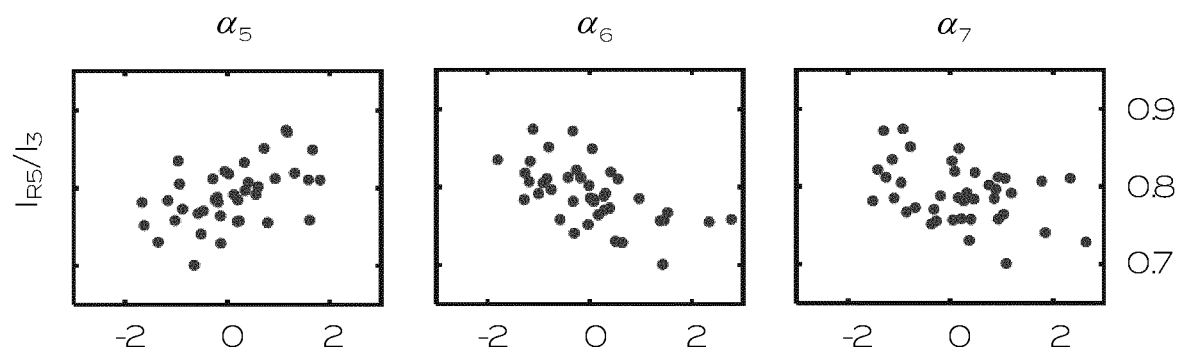
FIGS. 6a to 6j show a respective performance of the electrical circuit of FIG. 2 over variations in different parameters of the electrical components in respective scatterplot diagrams.
Figures 6D, 6E, 6F:
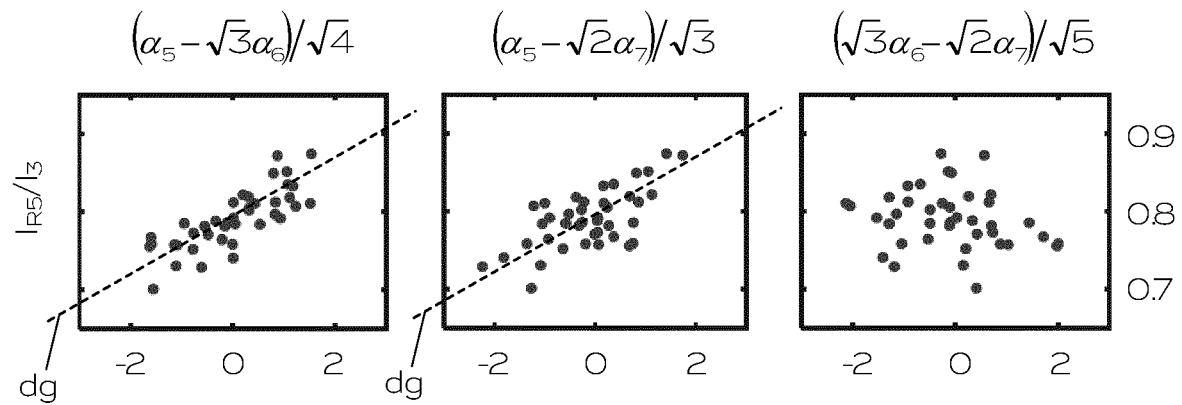
Figures 6G, 6H, 6I:
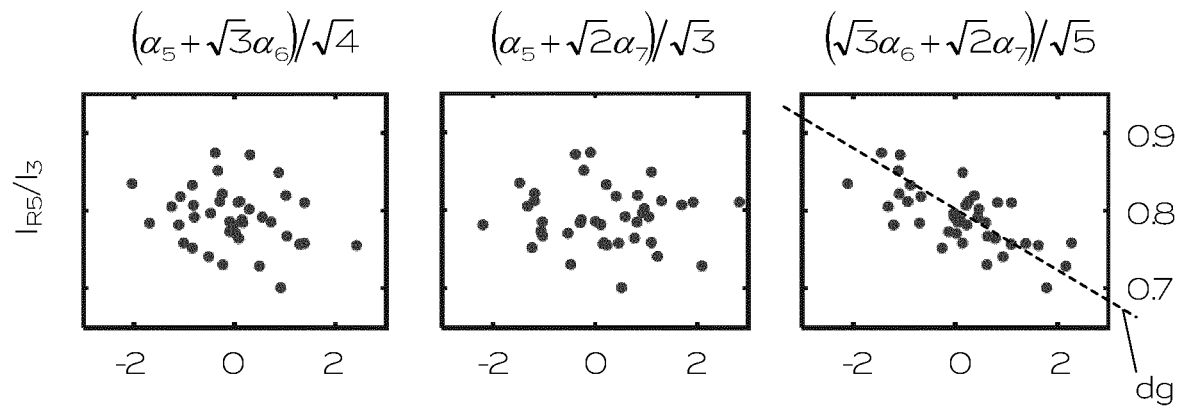
Figure 6J:
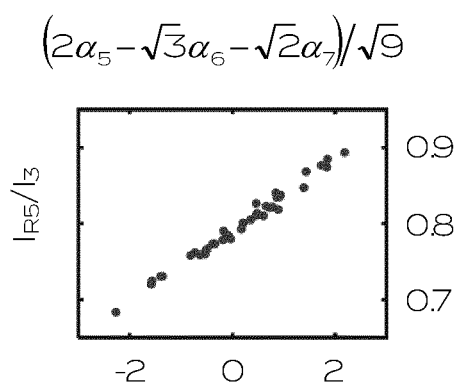

Therefrom, a topological parameter $t_k$ is derived according to $2x_5-x_6-x_7$, which is then (optionally) simplified and normalized by means of the size-coefficients $s_j$ into $2x_5/\sqrt{GA_5}-x_6/\sqrt{GA_6}-x_7/\sqrt{GA_7}$ and further to $(2x_5-\sqrt{3}x_6-\sqrt{2}x_7)/3$. FIG. 6j shows a scatterplot of a topological parameter $t_k$ according to this definition. Therein, the dependency, i.e., the influence on the performance $y_n$, is immediately obvious due to the almost ideally linear distribution of the calculation results.

The scatterplots of FIGS. 6a to 6i, and even more the one of FIG. 6j, visualise that the use of topological parameters $t_k$ generated for topological patterns $P_k$ of two or more electrical components $M_g$ in the circuit 1 effectively captures the dependencies between the performance $y_n$ of the electrical circuit 1 and the model parameter variation vectors $w_u$.

When, on the other hand, also the optional bias-coefficient $b_j$ shall be taken into account, each topological parameter $t_k$ is generated according to $$t_k = \sum_{j}^{J_k} s_{jk} b_{jk} x_{jk} \qquad \text{(eq. 5)}$$

with:
$t_k$ being the topological parameter $t_k$ of the $k^{th}$ topological pattern $P_k$;
$J_k$ being a total number of model parameters $x_j$ in the $k^{th}$ topological pattern $P_k$;
$x_{jk}$ being the $j^{th}$ model parameter in the $k^{th}$ topological pattern; and
$s_{jk}$, $b_{jk}$ being respective size and bias coefficients of said $j^{th}$ model parameter $x_j$.

It shall be understood that the investigation of all possible combinations of parameters $x_j$ and their variation vectors $w_u$ may be inefficient or even impossible, as for example when a circuit 1 has $10^4$ varying parameters $x_j$, the number of all possible dual and triple combinations is around $10^4 \times 10^4 = 10^8$ and $10^4 \times 10^4 \times 10^4 = 10^{12}$, respectively. However, when topological patterns $P_k$ are taken into account, the total number of such combinations is limited and proportional to $10^4$, e.g., $AN \times 10^4$, with AN being an integer indicating the average number of components $M_g$ with varying parameters $x_j$ which are interconnected to a single component $M_g$ with varying parameters $x_j$ in the topological pattern $P_k$.

In the optional embodiment of FIG. 7 and FIG. 1c, which is alternative to the embodiment of FIG. 4 and FIG. 1b, step 6 of the present method as shown in FIG. 1d, comprises the following steps.

In step 19, a variation vector $w_u$ is established for each of the model parameters $x_j$. The variation vector $w_u$ comprises, for each of the model parameters $x_j$, all candidate variations $x'_j$, of all variation samples $v_n$ of the multitude $_N$. Optionally, each variation vector $w_u$ is normalized by its variance.

Next, in step 20 said deviation vector $y_D$ generated in step 5 (FIG. 1d) is set as a starting-point for the residual vector $r_c$ in said iterative orthogonal matching pursuit, and the iteration counter c is set to its starting value.

In each iteration step of the orthogonal matching pursuit the following sub-steps are performed:

In sub-step 21, from the established variation vectors $w_u$ a predetermined number of variation vectors $w_u$ is searched and found which best match the residual vector $r_c$. This can be achieved, e.g., by a correlation or a dot product as has been explained in more detail above with respect to FIG. 4. Said predetermined number is higher than one. Each best-matching variation vector $w_u$ was established, in step 19, for a model parameter $x_j$ of an electrical component $M_g$ which is interconnected in one of the topological patterns $P_k$. In sub-step 22, the respective topological pattern $P_k$ is selected for each of said best-matching variation vectors $w_u$ found in sub-step 21. It is understood that at least some of the electrical components $M_g$ may optionally be interconnected in two (or even more) neighbouring topological patterns $P_k$, in which case two (or more) respective topological patterns $P_k$ will be selected in sub-step 22 for each of said best-matching variation vectors $w_u$ found in sub-step 21.

Thereafter, in sub-step 23, that topological pattern $P_k$ is found from said selected topological patterns $P_k$ the related variation vectors $w_u$ of which, i.e., the variation vectors $w_u$ of the model parameters $x_j$ of the electrical components $M_g$ interconnected therein, collectively best match the residual vector $r_c$. This collective matching can be achieved, e.g., by means of a method of least squares as described below.

Said finding in sub-step 23 may optionally be terminated when, for each of the selected topological patterns $P_k$, two or three (or, if desired, another predetermined number of) variation vectors $w_u$ which collectively best match the residual vector $r_c$ have been found.

Furthermore, in sub-step 23 said variation vectors $w_u$ of the found topological pattern $P_k$ which collectively best match the residual vector $r_c$ are added to a second group $E_2$. In subsequent sub-step 24, for each variation vector $w_u$ of said second group $E_2$, a weight factor fc is determined, e.g., by means of a method of least squares, such that the sum of all variation vectors $w_u$ of said second group $E_2$, when weighted with their respective weight factors $f_c$, approximates the deviation vector $y_D$. Hence, after two or more iterations of the orthogonal matching pursuit, a corresponding number of at least two or more variation vectors $w_u$ are in the second group $E_2$ and a respective weight factor $f_c$ is determined for each variation vectors $w_u$ anew in each iteration such that the deviation vector $y_D$ is best approximated.

It shall be mentioned, that said sub-steps 23 and 24 may optionally be merged in that, for each of said selected topological patterns $P_k$, the related variation vectors $w_u$ are combined with the variation vectors $w_u$ which have already been added to said second group $E_2$. In this case, respective weight factors $f_c$ for each variation vector $w_u$ are separately determined for each of said combinations of variation vectors $w_u$ of a selected topological pattern $P_k$ and variation vectors $w_u$ in the second group $E_2$; consequently, the combination which best approximates the deviation vector $y_D$ forms the second group $E_2$ for the next iteration, i.e., the variation vectors $w_u$ of the selected topological patterns $P_k$ which, together with the variation vectors $w_u$ already added to said group $E_2$, result in the best approximation of the deviation vector $y_D$ are added to said second group $E_2$.

In a subsequent decision sub-step 25, it is investigated whether a remainder ρ of this approximation, i.e., the difference between the approximation and the deviation vector $y_D$, has fallen below a predetermined second threshold $TH_2$; when this is not the case (branch "n" in FIG. 7), i.e., the remainder ρ is still too large, the iterative orthogonal matching pursuit is continued by setting, in sub-step 26, said remainder ρ as the new residual vector $r_c$ for the next iteration step and incrementing the counter c and by returning to sub-step 21.

When, on the other hand, the remainder ρ has fallen below said threshold $TH_2$ (branch "y" in FIG. 7), the orthogonal matching pursuit is completed in step 27 and the electrical components $M_g$* to be detected are identified by means of the variation vectors $w_u$ comprised in said second group $E_2$. When desired, the detected electrical components $M_g$* may optionally be ranked, e.g., based on the respective weight factor f, determined for each variation vector $w_u$ in the second group $E_2$ during the final iteration step.

This identification is unambiguous as mentioned above: Each candidate variation $x'_j$ is directly related to respective variation vectors $w_u$ in the corresponding topological pattern $P_k$; the variation vectors $w_u$, in turn, are related to model parameters $x_j$ and each model parameter $x_j$ is directly related to an electrical component $M_g$; and consequently the electrical components $M_g$ are unambiguously identified by the variation vectors $w_u$ comprised in the second group $E_2$.

Said second threshold $TH_2$ is predetermined based on statistical rules known to the skilled person.

It shall be noted that the iteration may optionally be terminated when the number of iterations equals said multitude N of variation samples $v_n$.

In the example of the optional embodiment of FIG. 8 of the present method, further steps are appended to the steps described above in respect to FIGS. 1, 4 and 7.

In step 28 which succeeds step 6 (or the respective steps 16 or 27 in the embodiments of FIGS. 4 and 7), a multitude Z of further variation samples $v_{N+1}, v_{N+2}, \ldots v_{N+Z}$, generally $v_z$, is generated, e.g., by means of Monte Carlo sampling.

In subsequent step 29, a performance deviation $\Delta y_z$ is estimated for each of said further variation samples $v_z$. The performance deviations $\Delta y_z$ are estimated on the basis of the weight factors fc, determined in steps 13 and 24, respectively, for each variation vector $w_u$ by means of which said electrical components $M_g$* to be detected were identified. The performance deviation $\Delta y_z$ is estimated to be higher the more a further variation sample $v_z$ resembles a variation vectors $w_u$ for which a weight factor $f_c$ of higher value was determined.

In subsequent step 30, said further variation samples $v_z$ are ranked according to said estimated performance deviations $\Delta y_z$. The ranking means that further variation samples $v_z$ with larger estimated performance deviations $\Delta y_z$ are ranked higher.

In subsequent step 31 an iteration starts, where the performance $y_z$ of the electrical circuit 1 is calculated for each further variation sample $v_z$, i.e., for one variation sample $v_z$ in each iteration, e.g., using SPICE simulation. The iteration is started with setting an iteration counter c to the highest ranked variation sample $v_z$ and calculate the performance $y_z$ of the electrical circuit 1 for this variation sample $v_z$.

Thereafter, in a first decision step 32, it is decided whether or not an irregularity (or failure) IR occurred, i.e., whether or not the circuit's calculated performance $y_z$ leaves a range of acceptable values and is thus unsatisfactory. When an irregularity IR is detected (branch "y" in the decision 32), an irregularity count IRC is incremented (step 33). In subsequent decision step 34, it is checked whether said irregularity count IRC exceeds a predetermined third threshold $TH_3$, and if so (branch "y" in the decision 34), the iteration is terminated and the irregularity count IR is output in step 35. In this case, the design of the present electrical circuit 1 is detected to be too much prone to irregularities (or failures) IR.

When, on the other hand, in decision step 34 the irregularity count IRC is found to be lower than said third threshold $TH_3$ (branch "n" in the decision 34), the iteration counter c is incremented in step 36 and the iteration continues in step 31 with calculating the performance $y_z$ of the electrical circuit 1 for the next lower ranked variation sample $v_z$. When in decision step 32 no irregularity IR was found (branch "n" in the decision 32), a further decision step 37 follows. In the decision 37, it is checked whether any irregularities IR have occurred in the past iterations, i.e., for a predetermined number CC of immediately previous consecutive calculations of the performance $y_z$. When the number of past iterations without occurrence of an irregularity IR exceeds said predetermined number CC (branch "y" in the decision 37), it is supposed that no (or only very few) more irregularities IR are likely to occur in future calculations of the performance $y_z$ in the iteration as further variation sample $v_z$ are lower ranked and thus their influence on the performance $y_z$ of the electrical circuit 1 is expected to be lower. Hence, the iteration is terminated and the irregularity count IRC is output in step 35.

When, on the other hand, in the decision 37 it is found that one or more irregularities IR have occurred within said predetermined number CC of previous consecutive calculations (branch "n" in the decision 37), the iteration counter c is incremented in step 36 and the iteration continues in step 31 with calculating the performance $y_z$ of the electrical circuit 1 for the next lower ranked variation sample $v_z$.

Embodiments of the invention can be implemented as a computer program executed on a Personal Computer, smartphone or tablet PC. Particularly, the electronic device can be implemented as a Personal Computer, smartphone or tablet PC device running a method according to the invention.

Embodiments of the invention can be implemented in digital electronic circuitry, in tangibly-embodied computer software or firmware, in computer hardware, including the structures disclosed in this specification and their structural equivalents, or in combinations of one or more of them. Embodiments can be implemented as computer programs, i.e., modules of computer program instructions encoded on a tangible non transitory program carrier for execution by data processing apparatus. The computer storage medium can be a machine-readable storage device, a random or serial access memory device, or a combination of one or more of them.

A computer program according to the invention can be written in any form of programming language, including compiled or interpreted languages, or declarative or procedural languages, and it can be deployed in any form, including as a stand-alone program or as a module, component, subroutine, or other unit suitable for use in a computing environment. A computer program may correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. Such computer program can be deployed to be executed on one computer or on multiple computers that are located at one site or distributed across multiple sites and interconnected by a communication network.

The processes and logic flows described herein can be performed by one or more programmable computers executing one or more computer programs to perform functions by operating on input data and generating output. The processes and logic flows can be performed by, and apparatus can also be implemented as, special purpose logic circuitry, such as an FPGA (field programmable gate array), an ASIC (application specific integrated circuit), or a GPU (General purpose graphics processing unit). Computers suitable for the execution of the method according to the invention can be based on either of general or special purpose microprocessors, or any other kind of central processing unit (CPU). Such central processing unit will receive instructions and data from a read only memory or a random access memory or both.

The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Moreover, a computer according to the invention can be embedded in another device, e.g., a mobile telephone, a smartphone, a tablet device, a mobile audio or video player, a game console, a Global Positioning System (GPS) receiver, or a portable storage device, e.g., a universal serial bus (USB) flash drive.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of the invention. Certain features that are described in this specification in the context of separate embodiments can also be implemented in combination in a single embodiment. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer-implemented method for detecting, in a netlist representing an electrical circuit with electrical components $M_g$ subject to variations δ of their model parameters $x_j$, those components $M_g^*$ the model parameter variations δ of which have the strongest influence on a given performance metric $y_n$ of the electrical circuit, comprising the following steps:
receiving, by an Interface Unit, the netlist, and extracting a topology Q of the circuit (1),
the model parameters $x_j$ of all components $M_g$ of the circuit,
the variations δ of all model parameters;
generating, by a Sampling Unit, preferably a Monte Carlo Simulation Unit, a multitude N of variation samples $v_n$, each comprising a different set of candidate variations $x'_j$ of the model parameters $x_j$;
calculating, by a Circuit Simulation Unit, preferably using a SPICE simulator, for each variation sample $v_n$, the performance metric $y_n$ of the circuit and a deviation from a predetermined standard performance metric of the circuit, the deviations for all variation samples $v_n$ of the multitude forming a deviation vector $y_D$; and
running, by an Optimization Unit, a numerical regression analysis, preferably an iterative orthogonal matching pursuit, on the variation samples $v_n$ and the deviation vector $y_D$ in order to detect $M_g^*$;
wherein the topology Q of the electric circuit is analyzed by a Topology Analyzing Unit and topological patterns $P_k$ are determined, which are formed by two or more electrically interconnected components $M_g$, such as interconnected transistors, and said topological patterns $P_k$ are passed on to the Optimization Unit, where they are used to improve the regression analysis by introducing additional dependencies between the candidate variations $x'_j$ of the model parameters $x_j$.

2. The method according to claim 1, characterized in that it comprises the following steps:
by a Preconditioning Unit being integrated with or connected to the Optimization Unit:
generating, for each topological pattern $P_k$, at least one topological parameter $t_k$ which is composed of the model parameters $x_j$ of the electrical components $M_g$ interconnected in said topological pattern $P_k$;
appending, to each variation sample $v_n$, for each topological parameter $t_k$, a candidate variation dependent on the candidate variations $x'_j$ of the respective model parameters $x_j$ of the electrical components interconnected in said topological pattern; and
establishing, for each of the topological and model parameters $t'_j$ and $x'_j$, a variation vector $w_u$ comprising all candidate variations $t'_j$ and $x'_j$ of all variation samples $v_n$ of the multitude N;
setting the deviation vector $y_D$ as a starting-point for a residual vector $r_c$ in the iterative orthogonal matching pursuit;
by the Optimization Unit, in each iteration step of the orthogonal matching pursuit:
finding a variation vector $w_u$ which best matches the residual vector $r_c$ and adding said variation vector $w_u$ to a first group $E_1$,
determining for each variation vector $w_u$ of said first group $E_1$, a weight factor $f_c$ such that the sum of all variation vectors $w_u$ of the first group $E_1$, weighted with their respective weight factors $f_c$, approximates the deviation vector $y_D$, and
setting a remainder ρ of said approximation as the residual vector $r_c$ for the next iteration step, until the remainder ρ falls below a predetermined first threshold $TH_1$;
by the Optimization Unit, identifying the components $M_g^*$ as members of the respective variation vectors $w_u$ comprised in the first group $E_1$.

3. The method according to claim 2, wherein each topological parameter $t_k$ is generated according to:

$$t_k = \sum_{j}^{J_k} s_{jk} b_{jk} x_{jk}$$

with:
- $t_k$ being the topological parameter of the $k^{th}$ topological pattern $P_k$;
- $J_k$ being a total number of model parameters of $P_k$;
- $x_{jk}$ being the $j^{th}$ model parameter in $P_k$; and
- $s_{jk}$, $b_{jk}$ being size and bias coefficients of said $j^{th}$ model parameter.

4. The method according to claim 1, characterized in that it comprises the following steps:
by a Preconditioning Unit being integrated with or connected to the Optimization Unit:
establishing, for each of the model parameters $x_j$, a variation vector $w_u$ comprising all candidate variations $x'_j$ of all variation samples $v_n$ of the multitude N;
setting said deviation vector $y_D$ as a starting-point for a residual vector $r_c$ in said iterative orthogonal matching pursuit;
by the Optimization Unit, in each iteration step of the orthogonal matching pursuit:
finding a predetermined number of variation vectors $w_u$ which best match the residual vector $r_c$,
selecting, for each best-matching variation vector $w_u$ found, the topological pattern $P_k$ in which that electrical component $M_g$ is interconnected in, which has the model parameter $x_j$ for which said variation vector $w_u$ was established,
finding, from the selected topological patterns $P_k$, that topological pattern $P_k$ the variation vectors $w_u$ of the model parameters $x_j$ of the electrical components $M_g$ interconnected therein collectively best match the residual vector $r_c$, and adding said variation vectors $w_u$ of the found topological pattern $P_k$ to a second group $E_2$,
determining, for each variation vector $w_u$ of said second group $E_2$, a weight factor $f_c$ such that the sum of all variation vectors $w_u$ of said second group $E_2$, weighted with their respective weight factors $f_c$, approximates the deviation vector $y_D$, and
setting a remainder $\rho$ of said approximation as the residual vector $r_c$ for the next iteration step, until the remainder $\rho$ falls below a predetermined second threshold $TH_2$;
by the Optimization Unit, identifying the components $M_g^*$ as members of the variation vectors $w_u$ comprised in the second group $E_2$.

5. The method according to claim 4, wherein said step of finding that topological pattern $P_k$ the variation vectors $w_u$ of which collectively best match the residual vector $r_c$ is terminated when, for each of the selected topological patterns $P_k$, a predetermined number of variation vectors $w_u$ which best match the residual vector $r_c$ have been found.

6. The method according to claim 5, wherein said predetermined number of variation vectors $w_u$ which best match the residual vector $r_c$ is two.

7. The method according to claim 2, wherein said determining the weight factor $f_c$ comprises a method of least squares.

8. The method according to claim 2, wherein each variation vector $w_u$ is normalized by its variance.

9. The method according to claim 2, further comprising the steps of:
generating, by the Sampling Unit, a multitude of further variation samples $v_z$;
estimating, by a Postprocessing Unit, for each further variation sample $v_z$, a performance deviation $\Delta y_z$ using the weight factors $f_c$ of the variation vectors $w_u$ by which said electrical components $M_g^*$ were identified;
ranking, by the Postprocessing Unit, said further variation samples $v_z$ according to said estimated performance deviations $\Delta y_z$;
calculating, by the Circuit Simulation Unit, a performance $y_z$ of the circuit for each further variation sample $v_z$ in the sequence of the ranking;
comparing, by the Postprocessing Unit, the performance $y_z$ of the circuit with a predetermined model performance and incrementing an irregularity count IRC with each irregularity in the circuit's calculated performance $y_z$ as compared to the model performance until either no irregularity occurs for a predetermined number of consecutive calculations or said irregularity count exceeds a predetermined third threshold $TH_3$; and
outputting, by an Output Unit, the irregularity count (IRC).

10. The method of claim 1, wherein the topological patterns $P_k$ are determined by running a nodal analysis using Kirchhoff's current law (KCL) and/or a mesh analysis using Kirchhoff's voltage law (KVL).

11. The method of claim 1, wherein the topological patterns $P_k$ are determined by evaluating the similarity of the topology to one or more predetermined target patterns, which preferably include two or more transistors with interconnected terminals.

12. A computer-readable medium comprising computer-executable instructions causing an electronic device to perform the method according to claim 1.

13. An electronic device comprising a processing unit, an electronic memory, and a communication unit, which is adapted to execute a method according to claim 1, comprising
a. an Interface Unit, adapted to receive a netlist and extract a topology Q of an electronic circuit, the model parameters $x^j$ of all components $M_g$ of the circuit, and the variations $\delta$ of all model parameters;
b. a Sampling Unit, preferably comprising a Monte Carlo Simulation Unit, adapted to generate a multitude N of variation samples $v_n$, each comprising a different set of candidate variations $x'_j$ of the model parameters $x_j$;
c. a Circuit Simulation Unit, such as a SPICE simulator, adapted to calculate for each variation sample $v_n$ a performance metric $y_n$ of the circuit and a deviation from a predetermined standard performance metric of the circuit, the deviations for all variation samples $v_n$ of the multitude forming a deviation vector $y_D$; and
d. an Optimization Unit, adapted to run a numerical regression analysis, preferably an iterative orthogonal matching pursuit, on the variation samples $v_n$ and the deviation vector $y_D$ in order to detect those components $M_g^*$ the model parameter variations $\delta$ of which have the strongest influence on the performance metric $y_n$ of the electrical circuit;
characterized in that it comprises
a Topology Analyzing Unit adapted to analyze the topology Q of the electric circuit and determine topological patterns $P_k$, which are formed by two or more electrically interconnected components $M_g$, such as interconnected transistors, and pass said topological patterns $P_k$ to the Optimization Unit, which is adapted to use them to improve the regression analysis by introducing additional dependencies between the candidate variations $x'_j$ of the model parameters $x_j$.

14. An electronic device according to claim 13, further comprising:
  a. a Preconditioning Unit which is integrated with or connected to the Optimization Unit and which is adapted to
    i. generate, for each topological pattern $P_k$, at least one topological parameter $t_k$ which is composed of the model parameters $x_j$ of the electrical components $M_g$ interconnected in said topological pattern $P_k$;
    ii. append, to each variation sample $v_n$, for each topological parameter $t_k$, a candidate variation $t'_j$ dependent on the candidate variations $x'_j$ of the respective model parameters $x_j$ of the electrical components interconnected in said topological pattern; and
    iii. establish, for each of the topological and model parameters $t'_j$ and $x'_j$, a variation vector $w_u$ comprising all candidate variations $t'_j$ and $x'_j$ of all variation samples $v_n$ of the multitude N;
    iv. set the deviation vector $y_D$ as a starting-point for a residual vector $r_c$ in the iterative orthogonal matching pursuit;
  wherein the Optimization Unit is further adapted to, in each iteration step of the orthogonal matching pursuit,
  b. find a variation vector $w_u$ which best matches the residual vector $r_c$ and adding said variation vector $w_u$ to a first group $E_1$,
  c. determine for each variation vector $w_u$ of said first group $E_1$, a weight factor $f_c$ such that the sum of all variation vectors $w_u$ of the first group $E_1$, weighted with their respective weight factors $f_c$, approximates the deviation vector $y_D$, and
  d. set a remainder ρ of said approximation as the residual vector $r_c$ for the next iteration step, until the remainder ρ falls below a predetermined first threshold $TH_1$;
  wherein the Optimization Unit is further adapted to identify the components $M_g^*$ as members of the respective variation vectors $w_u$ comprised in the first group $E_1$.

15. An electronic device according to claim 13, characterized in that it further comprises:
  a Preconditioning Unit which is integrated with or connected to the Optimization Unit and adapted to
  a. establish, for each of the model parameters $x_j$, a variation vector $w_u$ comprising all candidate variations $x'_j$ of all variation samples $v_n$ of the multitude N;
  b. set said deviation vector $y_D$ as a starting-point for a residual vector $r_c$ in said iterative orthogonal matching pursuit;
  wherein the Optimization Unit is adapted to, in each iteration step of the orthogonal matching pursuit:
  c. find a predetermined number of variation vectors $w_u$ which best match the residual vector $r_c$,
  d. select, for each best-matching variation vector $w_u$ found, the topological pattern $P_k$ in which that electrical component $M_g$ is interconnected in, which has the model parameter $x_j$ for which said variation vector $w_u$ was established,
  e. find, from the selected topological patterns $P_k$, that topological pattern $P_k$ the variation vectors $w_u$ of the model parameters $x_j$ of the electrical components $M_g$ interconnected therein collectively best match the residual vector $r_c$, and adding said variation vectors $w_u$ of the found topological pattern $P_k$ to a second group $E_2$,
  f. determine, for each variation vector $w_u$ of said second group $E_2$, a weight factor $f_c$ such that the sum of all variation vectors $w_u$ of said second group $E_2$, weighted with their respective weight factors $f_c$, approximates the deviation vector $y_D$, and
  g. set a remainder ρ of said approximation as the residual vector $r_c$ for the next iteration step, until the remainder ρ falls below a predetermined second threshold $TH_2$;
  wherein the Optimization Unit is adapted to identify the components $M_g^*$ as members of the variation vectors $w_u$ comprised in the second group $E_2$.

16. An electronic device according to claim 13, characterized in that the Sampling Unit is adapted to generate a multitude of further variation samples $v_z$ and it further comprises a Postprocessing Unit and an Output Unit, wherein
  a. the Postprocessing unit is adapted to estimate, for each further variation sample $v_z$, a performance deviation $\Delta y_z$ using the weight factors $f_c$ of the variation vectors $w_u$ by which said electrical components $M_g^*$ were identified; and rank said further variation samples $v_z$ according to said estimated performance deviations $\Delta y_z$;
  b. the Circuit Simulation Unit is adapted to calculate a performance $y_z$ of the circuit for each further variation sample $v_z$ in the sequence of the ranking;
  c. the Postprocessing Unit is further adapted to compare the performance $y_z$ of the circuit with a predetermined model performance and increment an irregularity count IRC with each irregularity in the circuit's calculated performance $y_z$ as compared to the model performance until either no irregularity occurs for a predetermined number of consecutive calculations or said irregularity count exceeds a predetermined third threshold $TH_3$; and
  d. the Output Unit is adapted to output the irregularity count (IRC).

17. An electronic device according to claim 13, characterized in that the Topology Analyzing Unit is adapted to determine the topological patterns $P_k$ by running a nodal analysis using Kirchhoff's current law (KCL) and/or a mesh analysis using Kirchhoff's voltage law (KVL).

18. An electronic device according to claim 13, characterized in that the Topology Analyzing Unit is adapted to determine the topological patterns $P_k$ by evaluating the similarity of the topology to one or more predetermined target patterns, which preferably include two or more transistors with interconnected terminals.

* * * * *